(12) United States Patent
Bi

(10) Patent No.: US 11,856,285 B2
(45) Date of Patent: Dec. 26, 2023

(54) SYSTEMS AND METHODS FOR ADJUSTING A MONITORING DEVICE

(71) Applicant: ZHEJIANG DAHUA TECHNOLOGY CO., LTD., Zhejiang (CN)

(72) Inventor: Junting Bi, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 82 days.

(21) Appl. No.: 17/804,302

(22) Filed: May 26, 2022

(65) Prior Publication Data
US 2022/0286599 A1    Sep. 8, 2022

Related U.S. Application Data

(63) Continuation of application No. PCT/CN2020/099659, filed on Jul. 1, 2020.

(30) Foreign Application Priority Data

Dec. 20, 2019    (CN) .......................... 201911329809.8

(51) Int. Cl.
*H04N 23/61*      (2023.01)
*G06T 7/70*      (2017.01)
(Continued)

(52) U.S. Cl.
CPC .............. *H04N 23/61* (2023.01); *G06T 7/70* (2017.01); *G06V 10/22* (2022.01); *G06V 20/52* (2022.01);
(Continued)

(58) Field of Classification Search
CPC ...... H04N 23/61; H04N 23/661; H04N 23/64; H04N 7/18; G06T 7/70;
(Continued)

(56) References Cited

U.S. PATENT DOCUMENTS

2014/0189096 A1    7/2014   Miller et al.

FOREIGN PATENT DOCUMENTS

CN    105208349 A      12/2015
CN    105245845 A    *   1/2016
(Continued)

OTHER PUBLICATIONS

International Search Report in PCT/CN2020/099659 dated Oct. 10, 2020, 4 pages.
(Continued)

*Primary Examiner* — Frantz B Jean
(74) *Attorney, Agent, or Firm* — METIS IP LLC

(57) ABSTRACT

The present disclosure relates to systems and methods for adjusting a monitoring device. The system may obtain one or more first monitoring images. The system may obtain, for each of one or more regions, a statistical value of at least one object in the region based on the one or more first monitoring images. The system may determine an adjustment instruction based on statistical values of the at least one object in the one or more regions. The system may adjust at least one monitoring setting of at least one monitoring device based on the adjustment instruction. The at least one monitoring device may be used to capture one or more second monitoring images.

20 Claims, 13 Drawing Sheets

(51) Int. Cl.
*G06V 20/52* (2022.01)
*G06V 10/22* (2022.01)
*H04N 7/18* (2006.01)
*H04N 23/60* (2023.01)
*H04N 23/661* (2023.01)

(52) U.S. Cl.
CPC ............... *H04N 7/18* (2013.01); *H04N 23/64* (2023.01); *H04N 23/661* (2023.01); *G06T 2207/30232* (2013.01); *G06T 2207/30242* (2013.01)

(58) Field of Classification Search
CPC .......... G06T 2207/30232; G06T 2207/30242; G06V 20/52; G06V 10/22
USPC ......................................................... 348/143
See application file for complete search history.

(56) References Cited

FOREIGN PATENT DOCUMENTS

| | | | |
|---|---|---|---|
| CN | 105245845 | A | 1/2016 |
| CN | 105930822 | A | 9/2016 |
| CN | 106303403 | A | 1/2017 |
| CN | 107360394 | A | 11/2017 |
| CN | 107623590 | A | 1/2018 |
| CN | 108206935 | A | 6/2018 |
| CN | 108921001 | A | 11/2018 |
| CN | 108965797 | A | 12/2018 |
| CN | 109543496 | A | 3/2019 |
| CN | 109819208 | A | 5/2019 |
| CN | 109922311 | A | 6/2019 |
| CN | 109922311 | A * | 6/2019 |
| CN | 110505440 | A | 11/2019 |
| CN | 110533087 | A | 12/2019 |
| EP | 3293963 | A1 | 3/2018 |
| JP | 2009194436 | A | 8/2009 |
| WO | 2021120591 | A1 | 6/2021 |

OTHER PUBLICATIONS

Written Opinion in PCT/CN2020/099659 dated Oct. 10, 2020, 5 pages.
The Second Office Action in Chinese Application No. 201911329809.8 dated Aug. 2, 2021, 20 pages.
The Extended European Search Report in European Application No. 20901789.6 dated Nov. 8, 2022, 10 pages.

* cited by examiner

SYSTEMS AND METHODS FOR ADJUSTING A MONITORING DEVICE

CROSS-REFERENCE TO RELATED APPLICATIONS

This application is a continuation of International Application No. PCT/CN2020/099659, filed on Jul. 1, 2020, which claims priority to Chinese Patent Application No. 201911329809.8 filed on Dec. 20, 2019, the contents of each of which are incorporated herein by reference in their entirety.

TECHNICAL FIELD

The present disclosure generally relates to monitoring technology, and more particularly, relates to systems and methods for adjusting a monitoring device.

BACKGROUND

With the development of communication and multimedia technologies, the exploration of monitoring technology and monitoring devices has developed rapidly nowadays. Commonly, a technician (e.g., monitoring personnel) can observe a count of objects (e.g., people, animals) in a plurality of regions in a monitoring range for a long time. According to the monitoring result, the technician may manually adjust a monitoring setting (e.g., a monitoring preset point) of a monitoring device used to monitor the monitoring range. However, in such cases, a high labor cost is needed during adjusting the monitoring device, and the efficiency and accuracy of adjusting the monitoring device are limited. Therefore, it is desirable to provide automatic systems and methods for adjusting the monitoring device, thereby reducing the labor cost and improving efficiency and accuracy of adjusting the monitoring device.

SUMMARY

An aspect of the present disclosure relates to a system for adjusting a monitoring device. The system may include at least one storage medium including a set of instructions and at least one processor in communication with the at least one storage medium. When executing the set of instructions, the at least one processor may be directed to cause the system to implement operations. The operations may include obtaining one or more first monitoring images; obtaining, for each of one or more regions, a statistical value of at least one object in the region based on the one or more first monitoring images; determining an adjustment instruction based on statistical values of the at least one object in the one or more regions; and adjusting at least one monitoring setting of at least one monitoring device based on the adjustment instruction. The at least one monitoring device may be used to capture one or more second monitoring images.

In some embodiments, the obtaining one or more first monitoring images may include obtaining the one or more first monitoring images with time and location information from a third party.

In some embodiments, the obtaining one or more first monitoring images may include obtaining the one or more first monitoring images captured by one or more capturing devices at one or more time points.

In some embodiments, the operations may further include determining the adjustment instruction based on one or more statistical values of the at least one object at the one or more time points by using an instruction generation model. The instruction generation model may include a machine learning model.

In some embodiments, the determining, for each of one or more regions, a statistical value of at least one object in the region based on the one or more first monitoring images may include for each of the one or more first monitoring images, determining a position relationship between the first monitoring image and each of the one or more regions; determining the at least one object and position information of the at least one object in the first monitoring image by using an object recognition model; and determining the statistical value of the at least one object in the region based on the position relationship between the first monitoring image and each of the one or more regions and the position information of the at least one object in the first monitoring image.

In some embodiments, the determining an adjustment instruction based on the statistical value of the at least one object in the region may include determining an object quantity indicator map based on one or more statistical values of the at least one object in the one or more regions and obtaining the adjustment instruction from an input device, wherein the adjustment instruction is determined by a user based on the object quantity indicator map.

In some embodiments, the determining an adjustment instruction based on the statistical value of the at least one object in the region may include determining whether at least one statistical value satisfies a predetermined condition and determining the adjustment instruction based on a determination result of whether the at least one statistical value satisfies the predetermined condition.

In some embodiments, the determination result may include that the at least one statistical value satisfies the predetermined condition, and the determining the adjustment instruction based on the determination result may include designating, among the one or more regions, at least one region corresponding to the at least one statistical value as at least one adjusted monitoring region of the at least one monitoring device.

In some embodiments, the adjusting at least one monitoring setting of at least one monitoring device based on the adjustment instruction may include for each of the at least one monitoring device, determining a difference between the adjustment instruction and the at least one monitoring setting of the monitoring device and adjusting the at least one monitoring setting of the monitoring device based on the difference.

In some embodiments, the operations may further include adjusting the at least one monitoring device based on the at least one monitoring setting.

A further aspect of the present disclosure relates to a method for adjusting a monitoring device. The method may be implemented on a computing device including at least one processor, at least one storage medium, and a communication platform connected to a network. The method may include obtaining one or more first monitoring images; obtaining, for each of one or more regions, a statistical value of at least one object in the region based on the one or more first monitoring images; determining an adjustment instruction based on statistical values of the at least one object in the one or more regions; and adjusting at least one monitoring setting of at least one monitoring device based on the adjustment instruction. The at least one monitoring device may be used to capture one or more second monitoring images.

In some embodiments, the obtaining one or more first monitoring images may include obtaining the one or more first monitoring images with time and location information from a third party.

In some embodiments, the obtaining one or more first monitoring images may include obtaining the one or more first monitoring images captured by one or more capturing devices at one or more time points.

In some embodiments, the method may further include determining the adjustment instruction based on one or more statistical values of the at least one object at the one or more time points by using an instruction generation model. The instruction generation model may include a machine learning model.

In some embodiments, the determining, for each of one or more regions, a statistical value of at least one object in the region based on the one or more first monitoring images may include for each of the one or more first monitoring images, determining a position relationship between the first monitoring image and each of the one or more regions; determining the at least one object and position information of the at least one object in the first monitoring image by using an object recognition model; and determining the statistical value of the at least one object in the region based on the position relationship between the first monitoring image and each of the one or more regions and the position information of the at least one object in the first monitoring image.

In some embodiments, the determining an adjustment instruction based on the statistical value of the at least one object in the region may include determining an object quantity indicator map based on one or more statistical values of the at least one object in the one or more regions and obtaining the adjustment instruction from an input device, wherein the adjustment instruction is determined by a user based on the object quantity indicator map.

In some embodiments, the determining an adjustment instruction based on the statistical value of the at least one object in the region may include determining whether at least one statistical value satisfies a predetermined condition and determining the adjustment instruction based on a determination result of whether the at least one statistical value satisfies the predetermined condition.

In some embodiments, the determination result may include that the at least one statistical value satisfies the predetermined condition, and the determining the adjustment instruction based on the determination result may include designating, among the one or more regions, at least one region corresponding to the at least one statistical value as at least one adjusted monitoring region of the at least one monitoring device.

In some embodiments, the adjusting at least one monitoring setting of at least one monitoring device based on the adjustment instruction may include for each of the at least one monitoring device, determining a difference between the adjustment instruction and the at least one monitoring setting of the monitoring device and adjusting the at least one monitoring setting of the monitoring device based on the difference.

In some embodiments, the method may further include adjusting the at least one monitoring device based on the at least one monitoring setting.

A still further aspect of the present disclosure relates to a system for adjusting a monitoring device. The system may include a monitoring image obtaining module, a statistical value obtaining module, an adjustment instruction determination module, and a monitoring setting adjustment module. The monitoring image obtaining module may be configured to obtain one or more first monitoring images. The statistical value obtaining module may be configured to obtain, for each of one or more regions, a statistical value of at least one object in the region based on the one or more first monitoring images. The adjustment instruction determination module may be configured to determine an adjustment instruction based on statistical values of the at least one object in the one or more regions. The monitoring setting adjustment module may be configured to adjust at least one monitoring setting of at least one monitoring device based on the adjustment instruction. The at least one monitoring device may be used to capture one or more second monitoring images.

In some embodiments, to obtain one or more first monitoring images, the monitoring image obtaining module may be configured to obtain the one or more first monitoring images with time and location information from a third party.

In some embodiments, to obtain one or more first monitoring images, the monitoring image obtaining module may be configured to obtain the one or more first monitoring images captured by one or more capturing devices at one or more time points.

In some embodiments, the adjustment instruction determination module may be configured to determine the adjustment instruction based on one or more statistical values of the at least one object at the one or more time points by using an instruction generation model. The instruction generation model may include a machine learning model.

In some embodiments, to determine, for each of one or more regions, a statistical value of at least one object in the region based on the one or more first monitoring images, the statistical value obtaining module may be configured to, for each of the one or more first monitoring images, determine a position relationship between the first monitoring image and each of the one or more regions; determine the at least one object and position information of the at least one object in the first monitoring image by using an object recognition model; and determine the statistical value of the at least one object in the region based on the position relationship between the first monitoring image and each of the one or more regions and the position information of the at least one object in the first monitoring image.

In some embodiments, to determine an adjustment instruction based on the statistical value of the at least one object in the region, the adjustment instruction determination module may be configured to determine an object quantity indicator map based on one or more statistical values of the at least one object in the one or more regions and obtain the adjustment instruction from an input device, wherein the adjustment instruction is determined by a user based on the object quantity indicator map.

In some embodiments, to determine an adjustment instruction based on the statistical value of the at least one object in the region, the adjustment instruction determination module may be configured to determine whether at least one statistical value satisfies a predetermined condition and determine the adjustment instruction based on a determination result of whether the at least one statistical value satisfies the predetermined condition.

In some embodiments, the determination result may include that the at least one statistical value satisfies the predetermined condition, and the determining the adjustment instruction based on the determination result may include designating, among the one or more regions, at least one region corresponding to the at least one statistical value as at least one adjusted monitoring region of the at least one monitoring device.

In some embodiments, to adjust at least one monitoring setting of at least one monitoring device based on the adjustment instruction, the monitoring setting adjustment module may be configured to, determine, for each of the at least one monitoring device, a difference between the adjustment instruction and the at least one monitoring setting of the monitoring device and adjust the at least one monitoring setting of the monitoring device based on the difference.

In some embodiments, the monitoring setting adjustment module may further be configured to adjust the at least one monitoring device based on the at least one monitoring setting.

A still further aspect of the present disclosure relates to a non-transitory computer readable medium including executable instructions. When the executable instructions are executed by at least one processor, the executable instructions may direct the at least one processor to perform a method. The method may include obtaining one or more first monitoring images; obtaining, for each of one or more regions, a statistical value of at least one object in the region based on the one or more first monitoring images; determining an adjustment instruction based on statistical values of the at least one object in the one or more regions; and adjusting at least one monitoring setting of at least one monitoring device based on the adjustment instruction. The at least one monitoring device may be used to capture one or more second monitoring images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
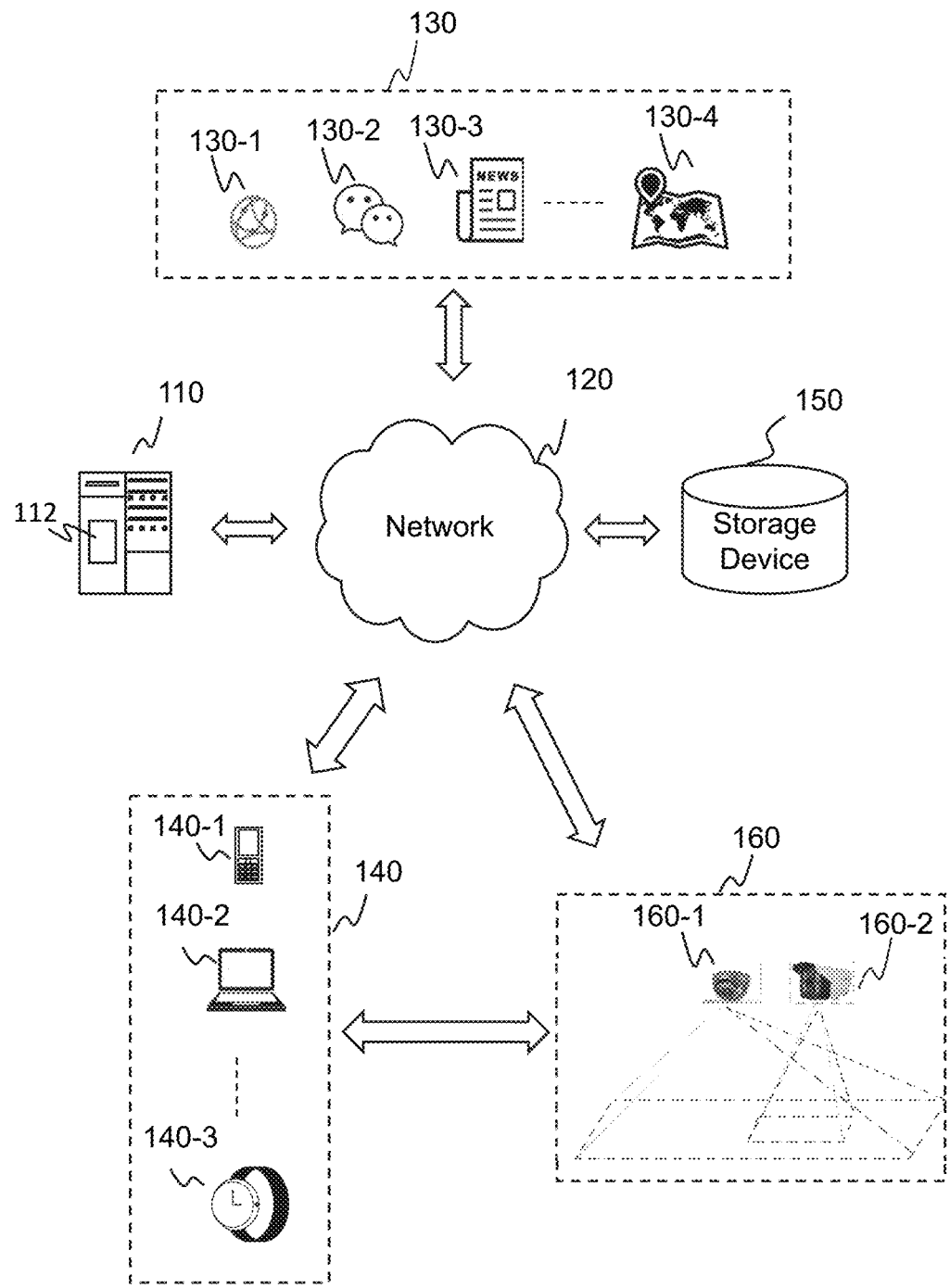
FIG. 1 is a schematic diagram illustrating an exemplary monitoring device adjustment system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for adjusting a monitoring device. The systems may obtain one or more first monitoring images, e.g., one or more monitoring images showing scenarios in one or more regions. For each of the one or more regions, the systems may obtain a statistical value (e.g., count information) of at least one object (e.g., people, vehicles, animals) in the region based on the one or more first monitoring images. According to the statistical values of the at least one object in the one or more regions, the systems may determine an adjustment instruction. Further, the systems may adjust at least one monitoring setting (e.g., a monitoring preset point) of at least one monitoring device based on the adjustment instruction. Then, the at least one monitoring device may be used to capture one or more second monitoring images.

According to the systems and methods of the present disclosure, statistical values of the at least one object in different regions may be obtained by recognizing the at least one object in the first monitoring images, thus providing a credible distribution of the at least one object in those regions. In addition, according to the credible distribution of the at least one object, at least one monitoring setting of a specific monitoring device may be adjusted such that the specific monitoring device can focus on a specific scene where, for example, the amount of the at least one object is greater than somewhere else. In this regard, the labor cost spent in the field of monitoring can be greatly reduced, and meanwhile, the ability of the monitoring device(s) for monitoring important scenes can be improved due to the effective and accurate measurements of the objects.

FIG. 1 is a schematic diagram illustrating an exemplary monitoring device adjustment system according to some embodiments of the present disclosure. In some embodiments, the monitoring device adjustment system 100 may adjust a monitoring setting of a monitoring device. For example, the monitoring device adjustment system 100 may determine a distribution of a crowd based on crowd monitoring data in a subway station. Further, the monitoring device adjustment system 100 may adjust a shooting angle of the monitoring device based on the distribution of the crowd to focus on a region where the crowd is concentrated. As shown in FIG. 1, the monitoring device adjustment system 100 may include a server 110, a network 120, a third party 130, a user device 140, a storage device 150, and a monitoring device 160.

The server 110 may be a single server or a server group. The server group may be centralized or distributed (e.g., the server 110 may be a distributed system). In some embodiments, the server 110 may be local or remote. For example, the server 110 may access information and/or data stored in the third party 130, the user device 140, the storage device 150, and/or the monitoring device 160 via the network 120. As another example, the server 110 may be directly connected to the third party 130, the user device 140, the storage device 150, and/or the monitoring device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to monitoring device adjustment to perform one or more functions described in the present disclosure. For example, the processing device 112 may obtain one or more first monitoring images showing scenarios in one or more regions. For each of the one or more regions, the processing device 112 may further obtain a statistical value of at least one object in the region based on the one or more first monitoring images. Further, the processing device 112 may determine an adjustment instruction based on statistical values of the at least one object in the one or more regions and adjust at least one monitoring setting of at least one monitoring device based on the adjustment instruction. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the third party 130, the user device 140, the monitoring device 160) of the monitoring device adjustment system 100. For example, the processing device 112 may be integrated into the third party 130, the user device 140, or the monitoring device 160 and the functions (e.g., adjusting the monitoring setting of the monitoring device 160) of the processing device 112 may be implemented by the third party 130, the user device 140, or the monitoring device 160.

The network 120 may facilitate exchange of information and/or data for the monitoring device adjustment system 100. In some embodiments, one or more components (e.g., the server 110, the third party 130, the user device 140, the storage device 150, the monitoring device 160) of the monitoring device adjustment system 100 may transmit information and/or data to other component(s) of the monitoring device adjustment system 100 via the network 120. For example, the server 110 may obtain the one or more first monitoring images from the third party 130 via the network 120. As another example, the server 110 may transmit the adjustment instruction to the monitoring device 160 via the network 120. As a further example, the server 110 may transmit an object quantity indicator map to the user device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The third party 130 may include a search engine 130-1, a social media 130-2, a news media 130-3, a map website 130-4, etc. The search engine 130-1 may include Google, Yahoo, Baidu, Microsoft, NHN, or the like, or any combination thereof. The social media 130-2 may include Facebook, Youtube, WhatsApp, LinkedIn, Twitter, Weibo, WeChat, QQ, or the like, or any combination thereof. The news media 130-3 may include Phoenix, Tencent News, Netease News, Sohu News, Associated Press, Cable News Network, or the like, or any combination thereof. The map website 130-4 may include Baidu map, Google map, Gaode map, Sogou map, or the like, or any combination thereof. In some embodiments, the third party 130 may transmit information and/or data (e.g., one or more first monitoring images with time and location information) to one or more components (e.g., the server 110, the user device 140, the storage device 150, the monitoring device 160) of the monitoring device adjustment system 100 via the network 120.

The user device 140 may be configured to receive information and/or data from the server 110, the third party 130, the storage device 150, and/or the monitoring device 160 via the network 120. For example, the user device 140 may receive the object quantity indicator map from the server 110. In some embodiments, the user device 140 may process information and/or data received from the server 110, the third party 130, the storage device 150, and/or the monitoring device 160 via the network 120. In some embodiments, the user device 140 may provide a user interface via which a user may view information and/or input data and/or instructions to the monitoring device adjustment system 100. For example, the user may view the object quantity indicator map via the user interface. As another example, the user may input an adjustment instruction via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the third party 130, the storage device 150, the monitoring device 160) of the monitoring device adjustment system 100 via the network 120.

The storage device 150 may be configured to store data and/or instructions. The data and/or instructions may be obtained from, for example, the server 110, the third party 130, the user device 140, the monitoring device 160, and/or any other component of the monitoring device adjustment system 100. In some embodiments, the storage device 150 may store data and/or instructions that the server 110 may execute or use to perform exemplary methods described in the present disclosure. For example, the storage device 150 may store the one or more first monitoring images. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the third party 130, the user device 140, the monitoring device 160) of the monitoring device adjustment system 100. One or more components of the monitoring device adjustment system 100 may access the data or instructions stored in the storage device 150 via the network 120. In some embodiments, the storage device 150 may be directly connected to or communicate with one or more components (e.g., the server 110, the third party 130, the user device 140, the monitoring device 160) of the monitoring device adjustment system 100. In some embodiments, the storage device 150 may be part of other components of the monitoring device adjustment system 100, such as the server 110, the third party 130, the user device 140, or the monitoring device 160.

The monitoring device 160 may be configured to acquire an image (the "image" herein refers to a single image or a frame of a video) of one or more regions in a monitoring range. In some embodiments, the monitoring device 160 may include a camera 160-1 (e.g., an object statistical camera), a video recorder 160-2, etc. The camera 160-1 may include a gun camera, a dome camera, an integrated camera, a monocular camera, a binocular camera, a multi-view camera, or the like, or any combination thereof. The video recorder 160-2 may include a PC Digital Video Recorder (DVR), an embedded DVR, or the like, or any combination thereof. The image acquired by the monitoring device 160 may be a two-dimensional image, a three-dimensional image, a four-dimensional image, etc. In some embodiments, the monitoring device 160 may include a plurality of components each of which can acquire an image. For example, the monitoring device 160 may include a plurality of sub-video recorder that can capture images or videos simultaneously. In some embodiments, the monitoring device 160 may transmit the acquired image to one or more components (e.g., the server 110, the third party 130, the user device 140, the storage device 150) of the monitoring device adjustment system 100 via the network 120.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
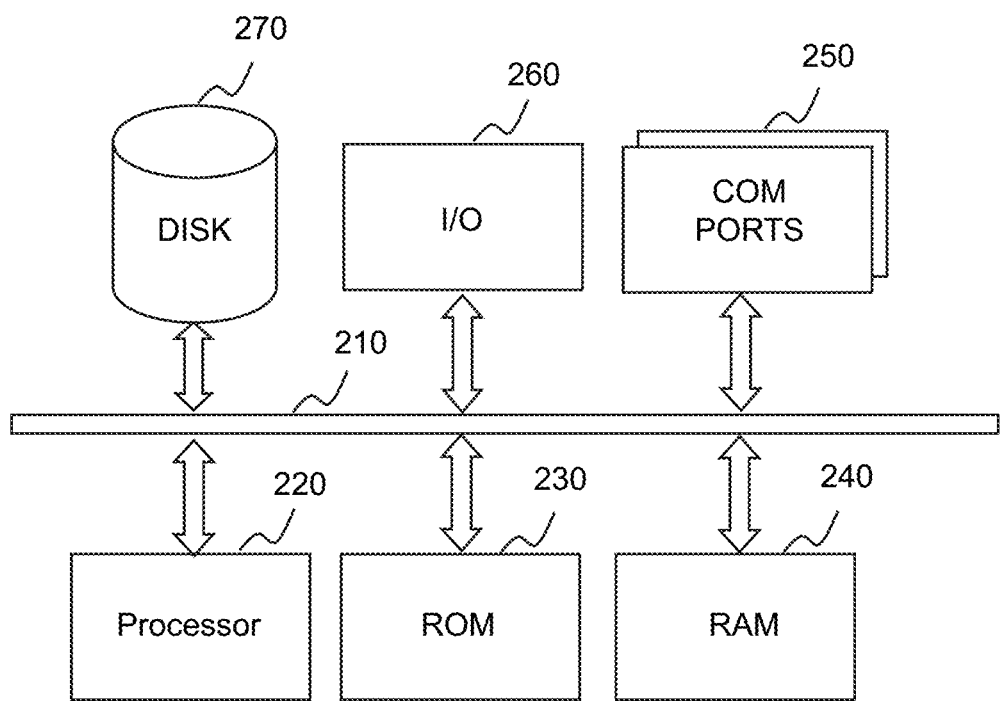
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the monitoring device adjustment system 100 as described herein. For example, the processing device 112 may be implemented on the computing device 200, via its hardware, software program, firmware, or a combination thereof. Although only one such computer is shown, for convenience, the computer functions relating to monitoring device adjustment as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
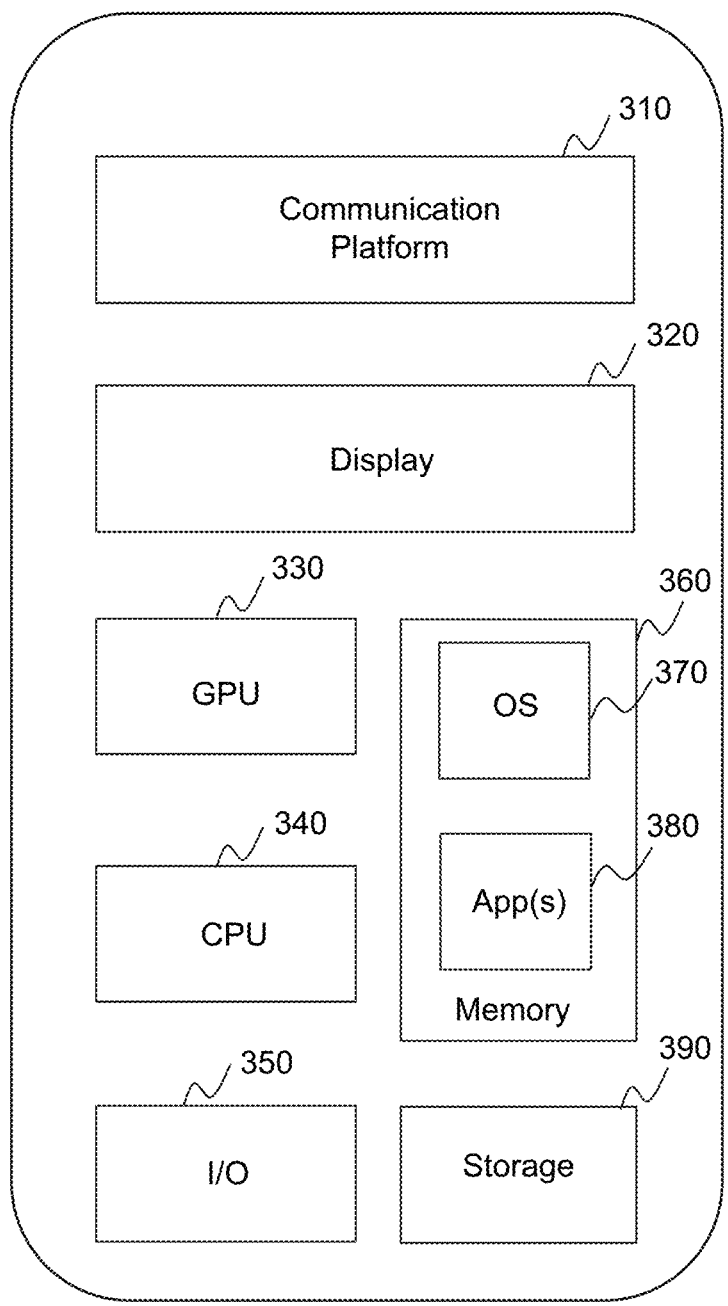
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to monitoring device adjustment or other information from the processing device 112. User interactions may be achieved via the I/O 350 and provided to the processing device 112 and/or other components of the monitoring device adjustment system 100 via the network 120.

Figure 4:
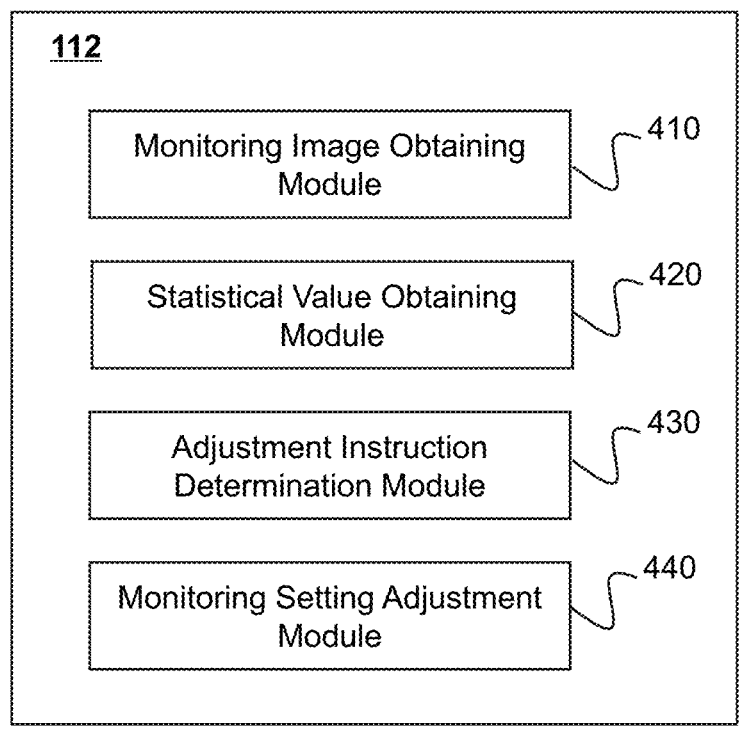
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include a monitoring image obtaining module 410, a statistical value obtaining module 420, an adjustment instruction determination module 430, and a monitoring setting adjustment module 440.

The monitoring image obtaining module 410 may be configured to obtain one or more first monitoring images. In some embodiments, the monitoring image obtaining module 410 may obtain the one or more first monitoring images with time and location information from a third party (e.g., the third party 130). In some alternative embodiments, the monitoring image obtaining module 410 may direct one or more capturing devices (e.g., the camera 160-1 (e.g., an object statistical camera), the video recorder 160-2) to capture the one or more first monitoring images in their corresponding monitoring ranges at one or more time points. More descriptions regarding the obtaining of one or more first monitoring images may be found elsewhere in the present disclosure. See, e.g., operation 510 in FIG. 5 and relevant descriptions thereof.

The statistical value obtaining module 420 may be configured to obtain, for each of one or more regions, a statistical value (e.g., count information of objects) of at least one object in the region based on the one or more first monitoring images. In some embodiments, for each of the one or more first monitoring images, the statistical value obtaining module 420 may determine a position relationship between the first monitoring image and each of the one or more regions. Further, the statistical value obtaining module 420 may determine the at least one object and position information of the at least one object in the first monitoring image by using an object recognition model. According to the position relationship between the first monitoring image and each of the one or more regions and the position information of the at least one object in the first monitoring image, the statistical value obtaining module 420 may determine the statistical value of the at least one object in the region. More descriptions regarding the determining of the statistical value may be found elsewhere in the present disclosure. See, e.g., operation 520 in FIG. 5, FIG. 6, and relevant descriptions thereof.

The adjustment instruction determination module 430 may be configured to determine an adjustment instruction based on statistical values of the at least one object in the one or more regions. In some embodiments, the adjustment instruction determination module 430 may determine the adjustment instruction based on one or more statistical values of the at least one object at the one or more time points by using an instruction generation model. In some embodiments, the adjustment instruction determination module 430 may determine an object quantity indicator map based on the one or more statistical values of the at least one object in the one or more regions. The adjustment instruction determination module 430 may transmit the object quantity indicator map to a user device (e.g., a user device 140) for display. A user (e.g., an administrator, a monitoring personnel) may view the object quantity indicator map on a display (e.g., the display 320) of the user device. According to the object quantity indicator map, the user may determine an adjustment instruction and input the adjustment instruction into the user device. Further, the adjustment instruction determination module 430 may obtain the adjustment instruction from the user device. In some embodiments, the adjustment instruction determination module 430 may determine whether at least one statistical value satisfies a predetermined condition. According to a determination result of whether the at least one statistical value satisfies the predetermined condition, the adjustment instruction determination module 430 may determine the adjustment instruction. More descriptions regarding the determining of the adjustment instruction may be found elsewhere in the present disclosure. See, e.g., operation 530 in FIG. 5, FIG. 7, and relevant descriptions thereof.

The monitoring setting adjustment module 440 may be configured to adjust at least one monitoring setting of at least one monitoring device based on the adjustment instruction. For each of the at least one monitoring device, the monitoring setting adjustment module 440 may determine a difference between the adjustment instruction and a current value of the at least one monitoring setting of the monitoring device. Further, the monitoring setting adjustment module 440 may adjust the at least one monitoring setting of the monitoring device based on the difference. More descriptions regarding the determining of the adjustment instruction may be found elsewhere in the present disclosure. See, e.g., operation 540 in FIG. 5 and relevant descriptions thereof.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the monitoring image obtaining module 410 and the statistical value obtaining module 420 may be combined as a single module which may both obtain the one or more first monitoring images and the statistical value of the at least one object. As another example, the processing device 112 may also include a transmission module configured to transmit signals (e.g., electrical signals, electromagnetic signals) to one or more components (e.g., the user device 140) of the monitoring device adjustment system 100. As a further example, the processing device 112 may include a storage module (not shown) used to store information and/or data (e.g., the one or more first monitoring images, the one or more regions, the statistical value of the at least one object, the adjustment instruction) associated with the monitoring device adjustment.

Figure 5:
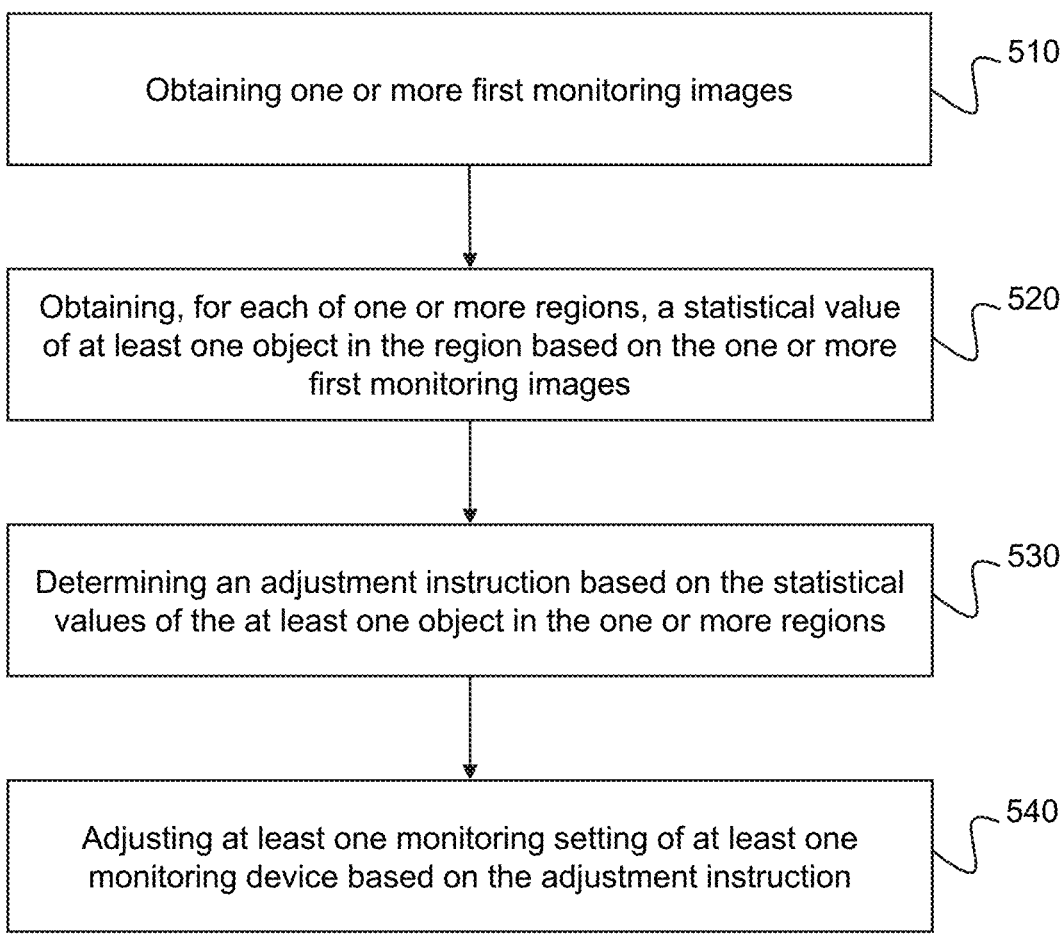
FIG. 5 is a flowchart illustrating an exemplary process for adjusting a monitoring device according to some embodiments of the present disclosure.

FIG. 5 is a flowchart illustrating an exemplary process for adjusting a monitoring device according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process is illustrated in FIG. 5 and described below is not intended to be limiting.

In 510, the processing device 112 (e.g., the monitoring image obtaining module 410, the interface circuits of the processor 210) may obtain one or more first monitoring images. As used herein, the first monitoring image may refer to an image in which the scenario is at least partially monitored by one or more monitoring devices, for example, the first monitoring image may be a panoramic image of a square. The one or more first monitoring images may be associated with one or more regions (also referred to as a "monitoring region"). For example, each first monitoring images may show a scenario in a specific region. The scenarios of different monitoring images may overlap or not overlap with each other.

In some embodiments, the processing device 112 may obtain the one or more first monitoring images with time and location information from a third party (e.g., the third party 130). As described in connection with FIG. 1, the third party 130 may include a search engine 130-1, a social media 130-2, a news media 130-3, a map website 130-4, etc. For example, the processing device 112 may obtain a video marked as "occurring at XX intersection" (i.e., the location information) from the social media 130-2 (e.g., Facebook) and extract one or more first monitoring images of the intersection from the video. As another example, the processing device 112 may obtain a photo of a park (i.e., the location information) from the map website 130-4 as a first monitoring image of the park. In some embodiments, for a specific first monitoring image, the processing device 112 may obtain the time and location information from image data of the first monitoring image. Further, the processing device 112 may determine a region associated with the first monitoring image based on the location information of the first monitoring image.

In some alternative embodiments, the processing device 112 may direct one or more capturing devices (e.g., the camera 160-1 (e.g., an object statistical camera), the video recorder 160-2) to capture the one or more first monitoring images in their corresponding monitoring ranges at one or more time points. Each of the one or more monitoring ranges may include at least one region. In some embodiments, the capturing range of a capturing device may be not fixed. In some embodiments, the capturing range of a capturing device may be the same, partially the same, or different from the capturing ranges of other capturing devices. The term "capturing range" or "monitoring range" are used interchangeably in the present disclosure. When the capturing ranges of two capturing devices are the same, angles at which the two capturing devices capture the first monitoring images may be different. In some embodiments, a time point when the capturing device captures the first monitoring image may be the same, partially the same, or different from time points when other capturing devices capture other first monitoring images. In some embodiments, the processing device 112 may direct the one or more capturing devices to capture the one or more first monitoring images based on a capturing plan or a capturing instruction. The capturing plan or the capturing instruction may be default settings of the monitoring device adjustment system 100 or may be adjustable under different situations. Further, the processing device 112 may obtain the one or more first monitoring images from the one or more capturing devices.

In some embodiments, the one or more first monitoring images may be previously obtained and stored in a storage device (e.g., the storage device 150, the storage device 220, and/or the storage 390). The processing device 112 may obtain the one or more first monitoring images from the storage device via a network (e.g., the network 120).

In 520, for each of one or more regions, the processing device 112 (e.g., the statistical value obtaining module 420, the interface circuits or the processing circuits of the processor 210) may obtain a statistical value (e.g., count information of objects) of at least one object in the region based on the one or more first monitoring images.

As used herein, an object may include a biological object and/or a non-biological object. The biological object may include people, an animal, a plant, or the like, or any combination thereof. The non-biological object may include a vehicle, an aircraft, a detector, a robot, or the like, or any combination thereof. For illustration purposes, the following descriptions regarding the object take people as an example.

The statistical value of the at least one object may refer to data associated with a count of the at least one object in a region in a period of time. The data may include a count of the at least one object, time data (e.g., the period of time) for obtaining the statistical value, and space data (e.g., a latitude, a longitude, a spatial coordinate) where the at least one object is located, etc. In some embodiments, the statistical value may indicate quantity and density changes of the at least one object over time or space. For example, the statistical value may be a count of people in a specific region within a specific period of time. As another example, the statistical value may be an average number or a variance of people in the specific region within the specific period of time.

In some embodiments, the statistical value may be previously obtained and stored in the storage device (e.g., the storage device 150, the storage device 220, and/or the storage 390). For example, the processing device 112 may direct one or more capturing devices (e.g., the camera 160-1, an object statistical camera) to obtain the statistical value. Further, the processing device 112 may obtain the statistical value from the storage device via the network (e.g., the network 120).

In some embodiments, for each of the one or more first monitoring images, the processing device 112 may determine a position relationship between the first monitoring image and each of the one or more regions. In other words, the processing device 112 may determine the corresponding relation between the scenario represented by the first monitoring image and each of the one or more regions. Further, the processing device 112 may determine the at least one object and position information of the at least one object in the first monitoring image by using an object recognition model. According to the position relationship between the first monitoring image and each of the one or more regions and the position information of the at least one object in the first monitoring image, the processing device 112 may determine the statistical value of the at least one object in the region. More descriptions regarding the determining of the statistical value may be found elsewhere in the present disclosure. See, e.g., FIG. 6 and relevant descriptions thereof.

In 530, the processing device 112 (e.g., the adjustment instruction determination module 430, the processing circuits of the processor 210) may determine an adjustment instruction based on statistical values of the at least one object in the one or more regions.

As used herein, the adjustment instruction may refer to an instruction used to direct an adjustment of monitoring parameters (e.g., a position of a current monitoring region) of a monitoring device. In some embodiments, the adjustment instruction may include adjustment information associated with the monitoring parameters of the monitoring device, for example, adjusted monitoring parameters (e.g., a position of an adjusted monitoring region) of the monitoring device.

The processing device 112 may determine the adjustment instruction based on one or more statistical values of the at least one object at the one or more time points by using an instruction generation model. In some embodiments, for each of the one or more time points, the processing device 112 may select at least one first monitoring image from the one or more first monitoring images associated with the one or more regions based on the time point and obtain a statistical value of at least one object in each region. For example, the processing device 112 may obtain statistical values of people in "A intersection" and "B intersection" at 8:00, 14:00, and 18:00, respectively, by recognizing people in first monitoring images which reflect the scenarios of "A intersection" and "B intersection" at 8:00, 14:00, and 18:00, respectively. Further, the processing device 112 may input the one or more statistical values of the at least one object at the one or more time points into the instruction generation model and determine the adjustment instruction based on an output of the instruction generation model.

In some embodiments, the instruction generation model may include a machine learning model, for example, a neural network model. The neural network model may include a multi-layer perceptron (MLP) model, a deep neural network (DNN) model, a convolutional neural network (CNN) model, a deep convolutional encoder-decoder (DCED) network model, a generative adversarial network (GAN) model, or the like, or any combination thereof. In some embodiments, parameters of the instruction generation model may be obtained by a training process. For example, the processing device 112 may train the instruction generation model based on a plurality of training samples with labels. Specifically, the processing device 112 may input the plurality of training samples into a preliminary instruction generation model and update the parameters of the preliminary instruction generation model based on the plurality of labeled training samples to obtain the instruction generation model.

The processing device 112 may determine an object quantity indicator map based on the one or more statistical values of the at least one object in the one or more regions. As used herein, the object quantity indicator map may refer to a map displaying information (e.g, a count of the at least one object, a time when an object was in a region, a position of the at least one object) associated with the at least one object in the one or more regions. In some embodiments, in the object quantity indicator map, the information may be marked by different visual effects (e.g., different colors, different brightness, etc.). For example, regions with different crowd densities may be marked with different colors. In some embodiments, the object quantity indicator map may indicate an actual distribution of the at least one object in the one or more regions. In some embodiments, the object quantity indicator map may be determined by one or more other components (e.g., the user device 140, the monitoring device 160) of the monitoring device adjustment system 100 or an external device. The processing device 112 may transmit the object quantity indicator map to a user device (e.g., a user device 140) for display. A user (e.g., an administrator, a monitoring personnel) may view the object quantity indicator map on a display (e.g., the display 320) of the user device. According to the object quantity indicator map, the user may determine an adjustment instruction and input the adjustment instruction into the user device. Further, the processing device 112 may obtain the adjustment instruction from the user device.

In some embodiments, the processing device 112 may determine whether at least one statistical value satisfies a predetermined condition. According to a determination result of whether the at least one statistical value satisfies the predetermined condition, the processing device 112 may determine the adjustment instruction. More descriptions regarding the determining of the adjustment instruction may be found elsewhere in the present disclosure. See, e.g., FIG. 7 and relevant descriptions thereof.

In 540, the processing device 112 (e.g., the monitoring setting adjustment module 440, the processing circuits of the processor 210) may adjust at least one monitoring setting of at least one monitoring device based on the adjustment instruction.

For each of the at least one monitoring device, the processing device 112 may determine a difference between the adjustment instruction and a current value of the at least one monitoring setting of the monitoring device. In some embodiments, a monitoring setting of the monitoring device may refer to a monitoring parameter (e.g., the position of the current monitoring region) of the monitoring device. The at least one monitoring setting may be default values of the monitoring device adjustment system 100 or may be adjustable under different situations. In some embodiments, the adjustment instruction may include one or more target values for the at least one monitoring setting of the monitoring device. For one of the at least one monitoring setting, the difference between the adjustment instruction and the current value of the monitoring setting may refer to a difference between the target value of the monitoring setting in the adjustment instruction and the current value of the monitoring setting. For example, one of the monitoring settings may be the position of the monitoring region, and in this case, the difference may be a difference between a position (value) of the target monitoring region and the position (value) of the current monitoring region of the monitoring device.

Further, the processing device 112 may adjust the at least one monitoring setting of the monitoring device based on the difference. Specifically, the processing device 112 may determine whether the difference satisfies a difference condition. In some embodiments, the processing device 112 may determine whether the difference is larger than a difference threshold. The difference threshold may be default settings of the monitoring device adjustment system 100 or may be adjustable under different situations. For example, the processing device 112 may determine whether the difference between the position of the target monitoring region and the position of the current monitoring region, e.g., the distance between the target position and the current position, is larger than the difference threshold (e.g., 20 cm). If the difference is larger than the difference threshold, the processing device 112 may determine that the difference satisfies the difference condition. If the difference is less than the difference threshold, the processing device 112 may determine that the difference does not satisfy the difference condition. If the difference is equal to the difference threshold, the processing device 112 may optionally determine that the difference satisfies or does not satisfy the difference condition, which depends on the actual situations.

In response to determining that the difference satisfies the difference condition, the processing device 112 may adjust the at least one monitoring setting of the monitoring device. For example, the processing device 112 may adjust the position of the current monitoring region in the monitoring setting to the position of the target monitoring region in the adjustment instruction. Further, the processing device 112 may adjust the monitoring device based on the at least one monitoring setting. For example, the processing device 112 may rotate the monitoring device or adjust the field of view of the monitoring device to monitor the adjusted monitoring region.

In some embodiments, the at least one monitoring device with the adjusted monitoring setting(s) may be used to capture one or more second monitoring images. As used herein, a second monitoring image may refer to an image of a region that needs to be monitored (e.g., the target monitoring region described above). After adjusting the at least one monitoring setting of the at least one monitoring device, the processing device 112 may direct the at least one monitoring device to capture the one or more second monitoring images. In some embodiments, the processing device 112 may designate the one or more second monitoring images as the one or more first monitoring images in a next adjustment of the at least one monitoring device. In other words, the second monitoring image(s) captured by the monitoring device may be directly used by the processing device 112 to obtain the statical values of the at least one object in different regions (as described in 520), which can be further used for determining an adjustment instruction associated with the monitoring device itself or other monitoring devices. In some embodiments, by doing so, the processing device 112 may direct a monitoring device to adjust its shooting mode in real time according to the scenario the monitoring device previously or currently captures.

In some embodiments, the capturing device(s) described in connection with the operation 510 may be same as the monitoring device(s) described in connection with the operation 530. That is to say, the processing device 112 may adjust at least one monitoring setting of at least one of the one or more capturing devices described in connection with the operation 510 based on the adjustment instruction. For each of the at least one of the one or more capturing devices, the processing device 112 may determine a difference between the adjustment instruction and a current value of the at least one monitoring setting of the capturing device. Further, the processing device 112 may adjust the at least one monitoring setting of the capturing device based on the difference. For example, the processing device 112 may adjust the position of the current monitoring region in the monitoring setting to the position of the target monitoring region in the adjustment instruction. Further, the processing device 112 may adjust the capturing device based on the at least one monitoring setting. For example, the processing device 112 may rotate the capturing device or adjust the field of view of the capturing device to capture images of the adjusted monitoring region.

In the present disclosure, the at least one monitoring setting of the at least one monitoring device or the one or more capturing devices can be adjusted based on the statistical values of the at least one object in the one or more regions, thereby reducing the labor cost and improving efficiency and accuracy of adjusting the monitoring device.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 500. In the storing operation, the processing device 112 may store information and/or data (e.g., the one or more first monitoring images, the one or more regions, the statistical value of the at least one object, the adjustment instruction) associated with the monitoring device adjustment in a storage device (e.g., the storage device 150) disclosed elsewhere in the present disclosure. As another example, operation 510 and operation 520 may be combined into a single operation in which the processing device 112 may obtain the one or more first monitoring images and the statistical value of the at least one object. As a further example, the processing device 112 may update the at least one monitoring setting of the at least one monitoring device periodically or irregularly based on one or more newly-obtained monitoring images (e.g., the first monitoring images, the second monitoring images).

Figure 6:
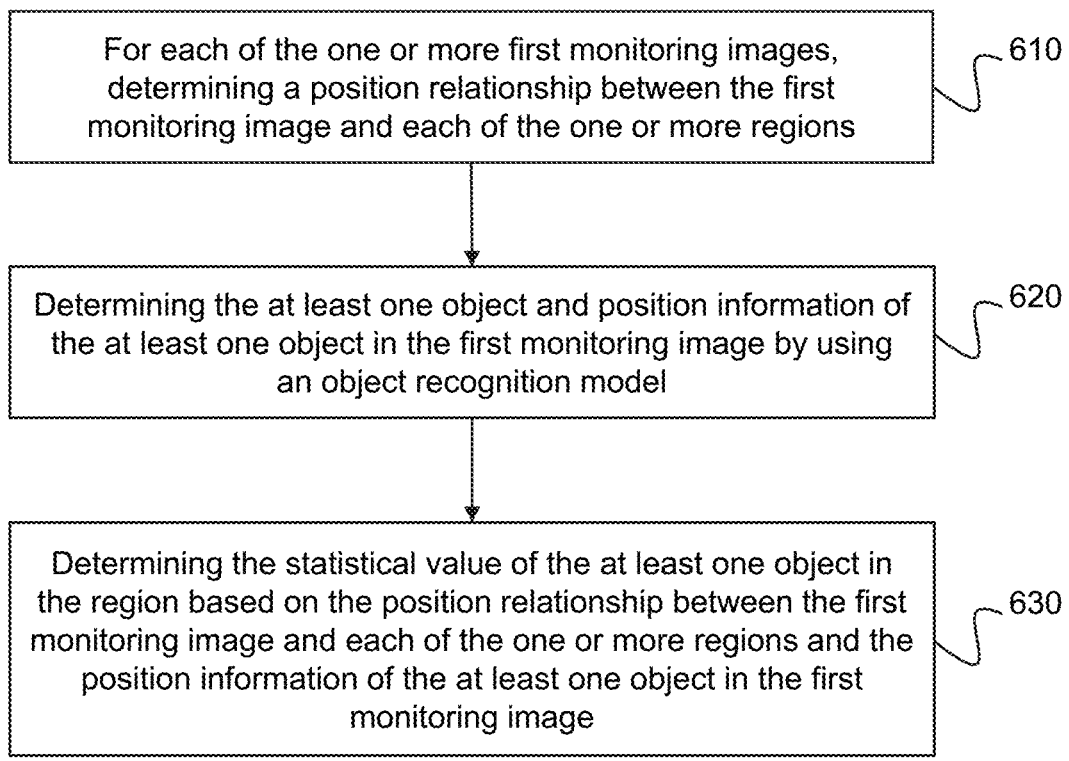
FIG. 6 is a flowchart illustrating an exemplary process for determining a statistical value of at least one object in a region according to some embodiments of the present disclosure.

FIG. 6 is a flowchart illustrating an exemplary process for determining a statistical value of at least one object in a region according to some embodiments of the present disclosure. In some embodiments, the process 600 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process is illustrated in FIG. 6 and described below is not intended to be limiting.

In 610, for each of the one or more first monitoring images, the processing device 112 (e.g., the statistical value obtaining module 420, the processing circuits of the processor 210) may determine a position relationship between the first monitoring image and each of the one or more regions.

In some embodiments, for a specific region, the position relationship may include whether the scenario represented by the first monitoring image is within the specific region, an overlap of the scenario represented by the first monitoring image and the specific region, a distance between the position of the first monitoring image and the specific region, a shooting orientation of the first monitoring image relative to the specific region, or the like, or any combination thereof. As used herein, the position of the first monitoring image refers to a representative position of the scenario represented by the first monitoring image. The representative position may be the position of a point (e.g., a center point, an edge point) of the scenario, or a calculated position by weighting multiple points of the scenario.

In some embodiments, the processing device 112 may obtain positions (e.g., a latitude, a longitude, a spatial coordinate) of the first monitoring image and one or more regions. Further, for each of the one or more regions, the processing device 112 may determine the position relationship between the first monitoring image and the region based on the positions of the first monitoring image and the region. In some embodiments, the processing device 112 may determine the position relationship between the first monitoring image and each of the one or more regions based on a machine learning model, for example, a neural network model. The neural network model may include an MLP model, a DNN model, a CNN model, a DCED network model, a GAN model, or the like, or any combination thereof. For example, the processing device 112 may input the first monitoring image and information (e.g., images of the one or more regions, geographic coordinates of the one or more regions) associated with the one or more regions into the machine learning model and determine the position relationship based on an output of the machine learning model.

In 620, the processing device 112 (e.g., the statistical value obtaining module 420, the processing circuits of the processor 210) may determine the at least one object and position information of the at least one object in the first monitoring image by using an object recognition model.

In some embodiments, the processing device 112 may input the first monitoring image into the object recognition model and determine the at least one object and the position information (e.g., a latitude, a longitude, a spatial coordinate) of the at least one object based on an output of the object recognition model. In some embodiments, the object recognition model may include an image recognition model. The image recognition model may include a support vector machine model (SWM), a boosting model, a nearest neighbor model, a neural network model, or the like, or any combination thereof. In some embodiments, parameters of the object recognition model may be obtained by a training process. For example, the processing device 112 may train the object recognition model based on a plurality of training samples with labels. Specifically, the processing device 112 may input the plurality of training samples into a preliminary object recognition model and update the parameters of the preliminary object recognition model based on the plurality of labeled training samples to obtain the object recognition model.

In 630, the processing device 112 (e.g., the statistical value obtaining module 420, the processing circuits of the processor 210) may determine the statistical value of the at least one object in the region based on the position relationship between the first monitoring image and each of the one or more regions and the position information of the at least one object in the first monitoring image.

In some embodiments, the processing device 112 may correlate the first monitoring images with one of the one or more regions based on the position relationship. For example, for each of the one or more regions, the processing device 112 may determine whether the scenario of the first monitoring image is within the region. If the scenario of the first monitoring image is within the region, the processing device 112 may correlate the first monitoring images with the region. As another example, for each of the one or more regions, the processing device 112 may determine whether the distance between the position of the first monitoring image and the region is less or equal to a distance threshold. The distance threshold may be default settings of the monitoring device adjustment system 100 or may be adjustable under different situations. If the distance is less or equal to a distance threshold, the processing device 112 may correlate the first monitoring images with the region.

After correlating the first monitoring images with the region, the processing device 112 may determine the statistical value of the at least one object in the region based on the position information of the at least one object in the first monitoring image. For example, assuming that the at least one object includes an object 1, an object 2, and an object 3 in the first monitoring image, the processing device 112 may determine a count of occurrences of the object 1, the object 2, and the object 3 in the first monitoring image as a preliminary statistical value of the object 1, the object 2, and the object 3 in the region. For each of the object 1, the object 2, and the object 3, the processing device 112 may determine a repeat count of occurrences of the object based on a count of positions where the object appears in the first monitoring image. For example, when the count of positions where the object appears is 10, the repeat count of occurrences of the object may be 9. Further, the processing device 112 may determine the statistical value of the object 1, the object 2, and the object 3 in the region by subtracting repeat counts of occurrences of the object 1, the object 2, and the object 3 from the preliminary statistical value of the object 1, the object 2, and the object 3 in the region. In other words, the statical value of the at least one object in the region may reflect the amount of different objects (e.g., people) that appear in the first monitoring images.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 7:
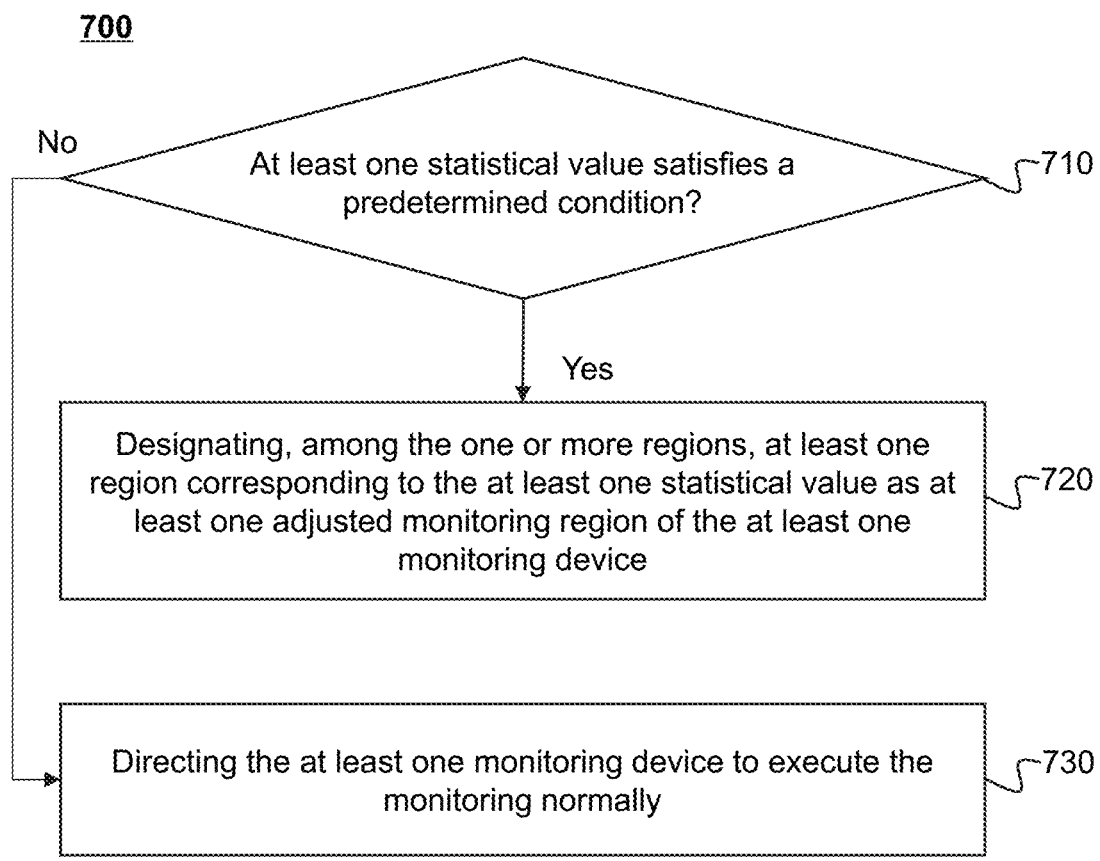
FIG. 7 is a flowchart illustrating an exemplary process for determining an adjustment instruction according to some embodiments of the present disclosure.

FIG. 7 is a flowchart illustrating an exemplary process for determining an adjustment instruction according to some embodiments of the present disclosure. In some embodiments, the process 700 may be implemented as a set of instructions (e.g., an application) stored in the storage ROM 230 or RAM 240. The processor 220 and/or the modules in FIG. 4, may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process is illustrated in FIG. 7 and described below is not intended to be limiting.

In 710, the processing device 112 (e.g., the adjustment instruction determination module 430, the processing circuits of the processor 210) may determine whether at least one statistical value satisfies a predetermined condition.

In some embodiments, the processing device 112 may determine whether a statistical value is higher than a value threshold. For example, the statistical value may indicate the amount of people appearing in the first monitoring image(s), and the value threshold may be default settings (e.g., 30, 50, 70) of the monitoring device adjustment system 100 or may be adjustable under different situations. In some embodiments, different regions may correspond to different value thresholds. For example, a value threshold for a region at a gate of a park may be 50, and a value threshold for a region inside the park may be 30. In some embodiments, a region may correspond to different value thresholds at different time points. For example, for the region at the gate of the park, a value threshold at 8 pm may be 70, and a value threshold at 8 am may be 30. If the statistical value is higher than the value threshold, the processing device 112 may determine the statistical value satisfies the predetermined condition. If the statistical value is less than the value threshold, the processing device 112 may determine the statistical value does not satisfy the predetermined condition. If the statistical value is equal to the value threshold, the processing device 112 may optionally determine that the statistical value satisfies or does not satisfy the predetermined condition, which depends on the actual situations.

Further, the processing device 112 may determine the adjustment instruction based on a determination result of whether at least one statistical value satisfies the predetermined condition. As used herein, the determination result may include that the at least one statistical value satisfies the predetermined condition or no statistical value satisfies the predetermined condition.

In 720, when the determination result is that the at least one statistical value satisfies the predetermined condition, the processing device 112 (e.g., the adjustment instruction determination module 430, the processing circuits of the processor 210) may designate, among the one or more regions, at least one region corresponding to the at least one statistical value as at least one adjusted monitoring region of the at least one monitoring device.

Among the one or more regions, the processing device 112 may identify at least one region (if any) corresponding to the at least one statistical value that satisfies the predetermined condition. Further, the processing device 112 may designate the at least one identified region as the at least one adjusted monitoring region in the adjustment instruction of the at least one monitoring device. Further, the processing device 112 may adjust the at least one monitoring device based on the at least one adjusted monitoring region in the adjustment instruction of the at least one monitoring device. For example, as described in connection with FIG. 5, the processing device 112 may rotate the at least one monitoring device or adjust the field of view (e.g., zoom in or out the field of view) of the at least one monitoring device to monitor the at least one adjusted monitoring region. By doing so, among multiple regions, the region of more importance, e.g., a region including higher density of people, can be specially monitored with the adjustment of the at least one monitoring device.

In 730, when the determination result is that no statistical value satisfies the predetermined condition, the processing device 112 (e.g., the monitoring setting adjustment module 440, the processing circuits of the processor 210) may direct the at least one monitoring device to execute the monitoring normally. For example, the processing device 112 may direct the at least one monitoring device to continue to monitor its current monitoring region.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
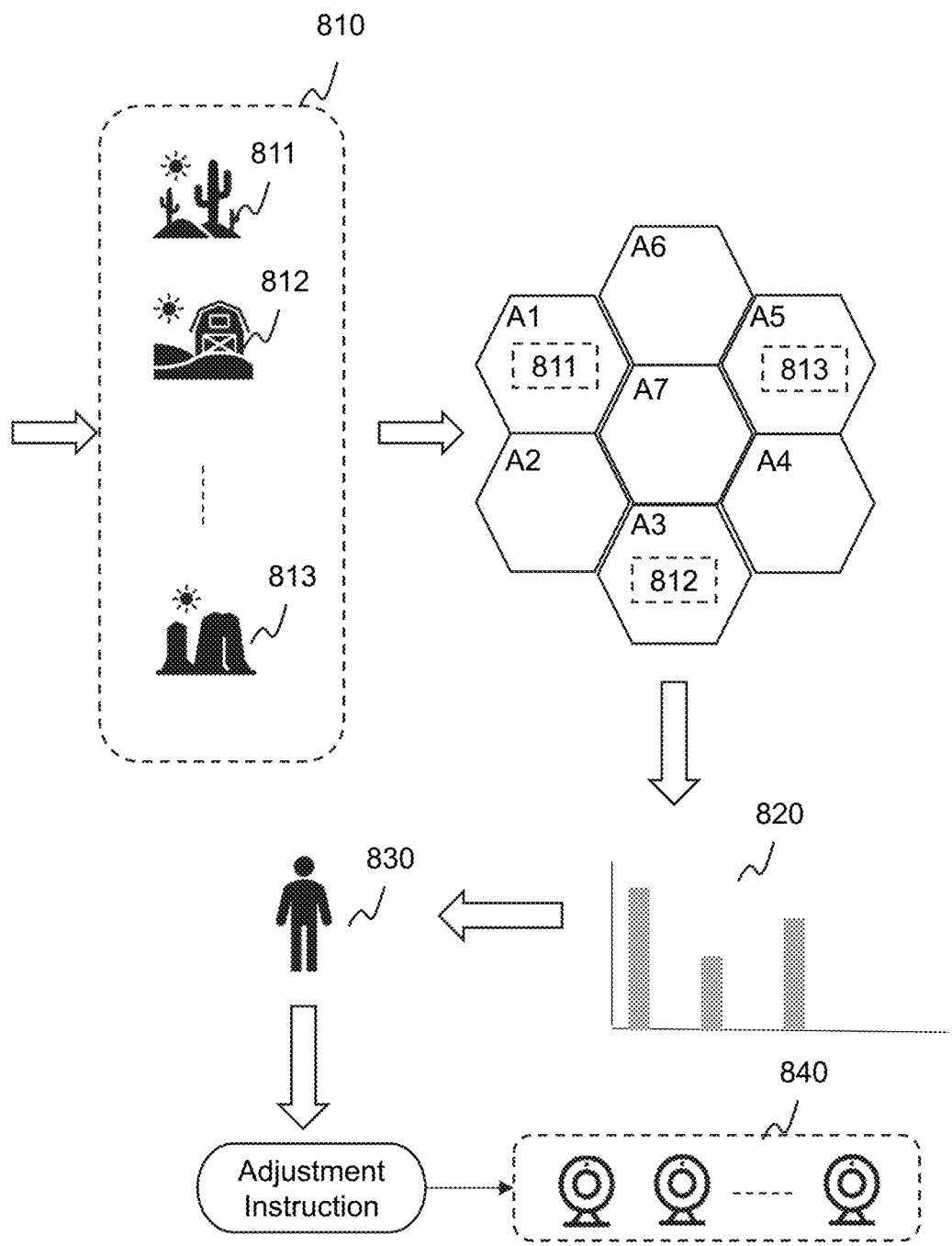
FIG. 8 is a schematic diagram illustrating exemplary operations of adjusting a monitoring device according to some embodiments of the present disclosure.

FIG. 8 is a schematic diagram illustrating exemplary operations of adjusting a monitoring device according to some embodiments of the present disclosure.

As illustrated in FIG. 8, the processing device 112 may obtain a plurality of first monitoring images 810 (e.g., 811, 812, 813) from a third party (e.g., the third party 130) or a capturing device (e.g., an object statistical camera, a monitoring device). For each (e.g., 811, 812, 813) of the plurality of first monitoring images 810, the processing device 112 may obtain a position (e.g., a latitude, a longitude, a spatial coordinate) of the first monitoring image from image data of the first monitoring image and determine whether the position of the first monitoring image is within one of one or more regions (e.g., A1, A2, A3, A4, A5, A6, A7). For example, the position of the first monitoring image 811 is within the region A1 (i.e., the scenario represented by the first monitoring image 811 is within the region A1), the position of the first monitoring image 812 is within the region A3, and/or the position of the first monitoring image 813 is within the region A5.

As described in connection with FIG. 5, the processing device 112 may identify at least one object (e.g., people) and position information of the at least one object in the first monitoring image and further determine statistical values of the at least one object in the region A1, the region A3, and the region A5, respectively. Statistical values corresponding to other regions (e.g., A2, A4, A6, A7) in the one or more regions may be 0 or is not described herein. The processing device 112 may determine an object quantity indicator map 820 to display the statistical values corresponding to the one or more regions (e.g., A1, A2, A3, A4, A5, A6, A7). Further, a user 830 (e.g., an administrator, a monitoring personnel) may view the object quantity indicator map 820 and determine an adjustment instruction based on the object quantity indicator map 820. According to the adjustment instruction, the processing device 112 may adjust at least one monitoring setting of monitoring devices 840.

In some embodiments, a monitoring preset point of a monitoring device (or an object statistical camera) refers to a position of a preset point (e.g., a center point) in a current monitoring region of the monitoring device (or the object statistical camera). The monitoring preset point of the monitoring device may be an example of a monitoring setting of the monitoring device. Adjusting the monitoring preset point of the monitoring device may be an example of adjusting the monitoring setting of the monitoring device. In some embodiments, an object statistical camera may be an example of the capturing device. Additionally or alternatively, the object statistical camera may be an example of the monitoring device. In some embodiments, count information of objects may be an example of the statistical value of the at least one object. In some embodiments, a back-end monitoring storage device may be an example of the processing device 112. In some embodiments, a region with a statistical value that satisfies the predetermined condition may be referred to as an object concentration region. In some embodiments, an administrator or a monitoring personnel may be an example of the user (e.g., the user 830). In some embodiments, a video recorder may be an example of the monitoring device.

Embodiment 1

Figure 9:
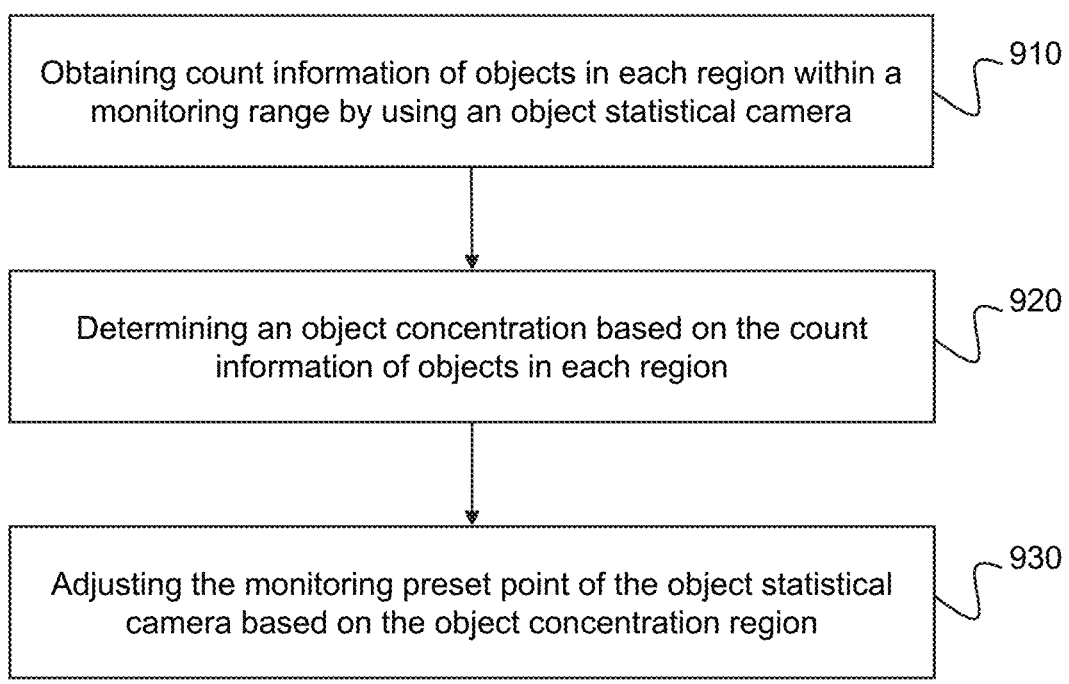
FIG. 9 is a flowchart illustrating an exemplary process for adjusting a monitoring preset point of a monitoring device according to some embodiments of the present disclosure.

FIG. 9 is a flowchart illustrating an exemplary process for adjusting a monitoring preset point of a monitoring device according to some embodiments of the present disclosure. In some embodiments, the process 900 may be implemented as a set of instructions (e.g., an application) stored in the storage ROM 230 or RAM 240. The processor 220 and/or the modules in FIG. 4, FIG. 10, and FIG. 11 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process is illustrated in FIG. 9 and described below is not intended to be limiting.

In 910, for each of one or more regions in a monitoring range of an object statistical camera, count information of objects in the region may be obtained by using the object statistical camera. In some embodiments, the object statistical camera may be directed by the processing device 112 (e.g., the statistical value obtaining module 420, the processing circuits of the processor 220), an adjustment device 1000 (e.g., a first obtaining module 1010) illustrated in FIG.

Figure 11:
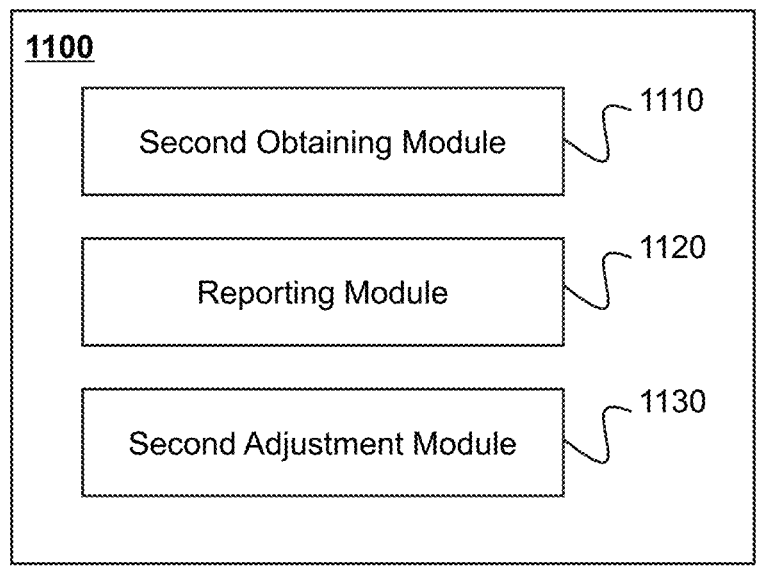
FIG. 11 is a block diagram illustrating an exemplary adjustment device of a monitoring preset point according to some embodiments of the present disclosure.

10, and/or an adjustment device 1100 (e.g., a second obtaining module 1110) illustrated in FIG. 11, to obtain the count information of objects.

Persons having ordinary skills in the art may understand that the count information of objects includes information indicating a count of objects. In some embodiments, the count information may be in various forms, e.g., a numerical form (e.g., a value of the count of objects) and/or a graphical form (e.g., a graph (e.g., the object quantity indicator map) displaying the corresponding count information of objects in different regions).

In 920, at least one object concentration region may be determined based on the count information of objects in the one or more regions. In some embodiments, the at least one object concentration region may be determined by the processing device 112 (e.g., the statistical value obtaining module 420, the processing circuits of the processor 220) and/or the adjustment device 1000 (e.g., a determination module 1020).

In some embodiments, the operation 920 may be divided into operation 921 and operation 922, and implemented through an interaction between the object statistical camera and a back-end monitoring storage device.

In 921, the object statistical camera may count the objects in the region and report the count information of objects to the back-end monitoring storage device.

In some embodiments, the operation 921 may be implemented by at least one of reporting manners described below. Reporting manner 1: the object statistical camera may regularly report the count information of objects to the back-end monitoring storage device based on a predetermined reporting period. Reporting manner 2: the object statistical camera may report the count information of objects to the back-end monitoring storage device in response to a query request sent by the back-end monitoring storage device.

In 922, the back-end monitoring storage device may receive and store the count information of objects reported by the object statistical camera. In some embodiments, the back-end monitoring storage device may be integrated into the processing device 112.

In some embodiments, in the operation 920, the object concentration region may be determined according to various determination techniques. For example, a position of the object concentration region may be determined by using at least one of determination techniques described below.

Determination Technique 1

For a specific region, the back-end monitoring storage device may determine whether the region satisfies an object concentration condition based on the count information of objects in the region. In some embodiments, a region with its count of objects higher than a count threshold may be regarded as the region that satisfies the object concentration condition. As used herein, the count threshold may be a default setting of the monitoring device adjustment system 100 or may be adjustable under different situations. In some alternative embodiments, the regions may be ranked according to their counts of objects, and a region with its count of objects among the top N regions may be regarded as the region that satisfies the object concentration condition. As used herein, N may be equal to a count of the monitoring preset points of the object statistical camera. In response to determining that the region satisfies the object concentration condition, the back-end monitoring storage device may determine the region as an object concentration region.

Determination Technique 2

The back-end monitoring storage device may generate an object quantity indicator map based on the count information of objects in the one or more regions and control a display screen to display the object quantity indicator map. Further, the back-end monitoring storage device may receive indication information indicating the at least one object concentration region. As used herein, the object quantity indicator map may be configured to display count information of objects in the one or more regions. In some embodiments, the object quantity indicator map may include an object heat map. In the object heat map, the count information of objects in different value ranges may be marked by different visual effects (e.g., different colors, different brightness, etc.). In some embodiments, the determination technique may be triggered by the back-end monitoring storage device according to a query request for an object quantity indicator map inputted by an administrator. Specifically, a query request for an object quantity indicator map in a period of time may be input by the administrator. In response to the query request, the back-end monitoring storage device may read count information of objects in the period of time and generate the object quantity indicator map in the corresponding period of time. For example, the object quantity indicator map may be a static or dynamic object quantity indicator map synthesized based on the count information of objects in the period of time. According to the object quantity indicator map displayed by the back-end monitoring storage device, the administrator may determine at least one object concentration region and input indication information (e.g., monitoring preset points specified by the administrator) indicating the at least one object concentration region into the back-end monitoring storage device.

Persons having ordinary skills in the art should understand that the determination technique 1 and the determination technique 2 may be used independently or in combination to determine the object concentration region. When the determination technique 1 and the determination technique 2 is used in combination, at least one initial object concentration region may be determined automatically based on the count information of objects reported by the object statistical camera by using the determination technique 1. Simultaneously, the object quantity indicator map may be visually displayed to the administrator by using the determination technique 2. The administrator may specify at least one other initial object concentration region based on the object quantity indicator map. Further, the at least one object concentration region may be determined by comparing the at least one initial object concentration regions obtained by using the determination technique 1 and the determination technique 2, respectively. For example, if the at least one initial object concentration region obtained by using the determination technique 1 is partially or completely different from the at least one initial object concentration region obtained by using the determination technique 2, the at least one initial object concentration region obtained by using the determination technique 2 may be designated as the at least one object concentration region, and the at least one monitoring preset point of the object statistical camera may be adjusted based on the at least one object concentration region.

In 930, at least one monitoring preset point of the object statistical camera may be adjusted based on the at least one object concentration region. In some embodiments, the at least one monitoring preset point of the object statistical camera may be adjusted by the processing device 112 (e.g., the monitoring setting adjustment module 440, the processing circuits of the processor 220), the adjustment device 1000 (e.g., a first adjustment module 1030), and/or the adjustment device 1100 (e.g., a second adjustment module 1130).

In the present disclosure, the at least one monitoring preset point of the object statistical camera may be adjusted in real time according to actual object concentration situation (e.g., a density of the objects) in the one or more regions in the monitoring range of the object statistical camera, which can solve the problem that the monitoring preset point of the object statistical camera is fixed and a density of the objects in each region cannot be tracked in real time, thereby achieving effective supervision of key positions and key regions.

In some embodiments, for a specific monitoring preset point, whether a deviation between the specific monitoring preset point and an object concentration region (e.g., a central position of the object concentration region) corresponding to the monitoring preset point is larger than or equal to a deviation threshold may be determined. As used herein, the deviation threshold may be a default setting of the monitoring device adjustment system 100 or may be adjustable under different situations. Further, if the deviation is larger than or equal to the deviation threshold, the monitoring preset point of the object statistical camera may be adjusted to the central position of the object concentration region. In some embodiments, the process of adjusting the monitoring preset point of the object statistical camera may be achieved by sending an adjustment instruction to the object statistical camera by the back-end monitoring storage device.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Embodiment 2

Figure 10:
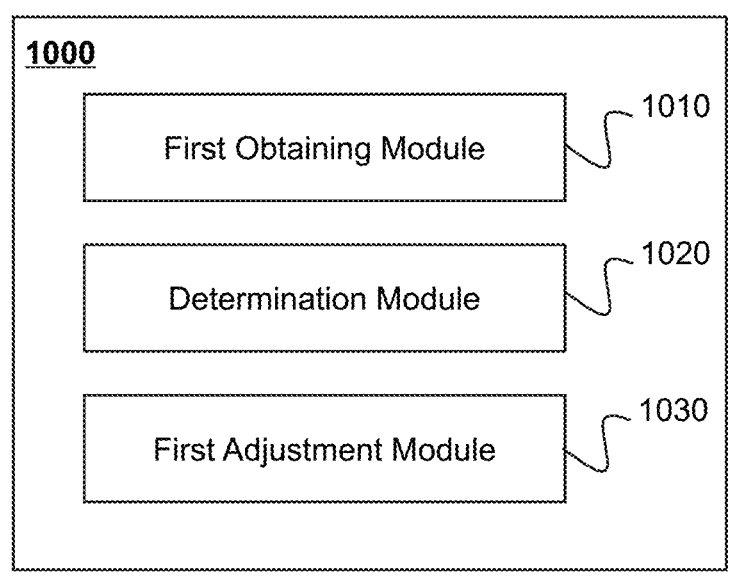
FIG. 10 is a block diagram illustrating an exemplary adjustment device of a monitoring preset point according to some embodiments of the present disclosure.

FIG. 10 is a block diagram illustrating an exemplary adjustment device of a monitoring preset point according to some embodiments of the present disclosure. The adjustment device 1000 may include a first obtaining module 1010, a determination module 1020, and a first adjustment module 1030. In some embodiments, one or more components of the adjustment device 1000 may be integrated into the back-end monitoring storage device. In some embodiments, one or more components of the adjustment device 1000 may be integrated into the processing device 112.

The first obtaining module 1010 may be configured to obtain, for each of one or more regions in a monitoring range of an object statistical camera, count information of objects in the region by using the object statistical camera. In some embodiments, the first obtaining module 1010 may control the object statistical camera to obtain the count information of objects in the region. Further, the first obtaining module 1010 may obtain and store the count information of objects reported by the object statistical camera.

The determination module 1020 may be configured to determine at least one object concentration region based on the count information of objects in the one or more regions. The determination module 1020 may determine a position of the object concentration region by using at least one of determination techniques described below.

Determination Technique 1

For a specific region, the determination module 1020 may determine whether the region satisfies an object concentration condition based on the count information of objects in the region. In some embodiments, a region with its count of objects higher than a count threshold may be regarded as the region that satisfies the object concentration condition. As used herein, the count threshold may be a default setting of the monitoring device adjustment system 100 or may be adjustable under different situations. In some alternative embodiments, the regions may be ranked according to their counts of objects, and a region with its count of objects among the top N regions may be regarded as the region that satisfies the object concentration condition. As used herein, N may be equal to a count of the monitoring preset points of the object statistical camera. In response to determining that the region satisfies the object concentration condition, the determination module 1020 may determine the region as an object concentration region.

Determination Technique 2

The determination module 1020 may generate an object quantity indicator map based on the count information of objects in the one or more regions and control a display screen to display the object quantity indicator map. Further, the determination module 1020 may receive indication information indicating the at least one object concentration region. As used herein, the object quantity indicator map may be configured to display count information of objects in the one or more regions. In some embodiments, the object quantity indicator map may include an object heat map. In the object heat map, the count information of objects in different value ranges may be marked by different visual effects (e.g., different colors, different brightness, etc.). In some embodiments, the determination technique may be triggered by the determination module 1020 according to a query request for an object quantity indicator map inputted by an administrator. Specifically, a query request for an object quantity indicator map in a period of time may be input by the administrator. In response to the query request, the determination module 1020 may read count information of objects in the period of time and generate the object quantity indicator map in the corresponding period of time. For example, the object quantity indicator map may be a static or dynamic object quantity indicator map synthesized based on the count information of objects in the period of time. According to the object quantity indicator map displayed by the determination module 1020, the administrator may determine at least one object concentration region and input indication information (e.g., monitoring preset points specified by the administrator) indicating the at least one object concentration region into the determination module 1020.

Persons having ordinary skills in the art should understand that the determination technique 1 and the determination technique 2 may be used independently or in combination to determine the object concentration region. When the determination technique 1 and the determination technique 2 is used in combination, at least one initial object concentration region may be determined automatically based on the count information of objects reported by the object statistical camera by using the determination technique 1. Simultaneously, the object quantity indicator map may be visually displayed to the administrator by using the determination technique 2. The administrator may specify at least one other initial object concentration region based on the object quantity indicator map. Further, the at least one object concentration region may be determined by comparing the at least one initial object concentration regions obtained by using the determination technique 1 and the determination technique 2, respectively. For example, if the at least one initial object concentration region obtained by using the determination technique 1 is partially or completely different from the at least one initial object concentration region obtained by using the determination technique 2, the at least one initial object concentration region obtained by using the determination technique 2 may be designated as the at least one object concentration region, and the at least one monitoring preset point of the object statistical camera may be adjusted based on the at least one object concentration region.

The first adjustment module 1030 may be configured to adjust at least one monitoring preset point of the object statistical camera based on the at least one object concentration region.

In the present disclosure, the at least one monitoring preset point of the object statistical camera may be adjusted in real time according to actual object concentration situation (e.g., a density of the objects) in the one or more regions in the monitoring range of the object statistical camera, which can solve the problem that the monitoring preset point of the object statistical camera is fixed and a density of the objects in each region cannot be tracked in real time, thereby achieving effective supervision of key positions and key regions.

In some embodiments, for a specific monitoring preset point, whether a deviation between the specific monitoring preset point and an object concentration region (e.g., a central position of the object concentration region) corresponding to the monitoring preset point is larger than or equal to a deviation threshold may be determined. As used herein, the deviation threshold may be a default setting of the monitoring device adjustment system 100 or may be adjustable under different situations. Further, if the deviation is larger than or equal to the deviation threshold, the monitoring preset point of the object statistical camera may be adjusted to the central position of the object concentration region. In some embodiments, the process of adjusting the monitoring preset point of the object statistical camera may be achieved by sending an adjustment instruction to the object statistical camera by the first adjustment module 1030.

The modules in the adjustment device 1000 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Embodiment 3

FIG. 11 is a block diagram illustrating an exemplary adjustment device of a monitoring preset point according to some embodiments of the present disclosure. The adjustment device 1100 may include a second obtaining module 1110, a reporting module 1120, and a second adjustment module 1130. In some embodiments, one or more components of the adjustment device 1100 may be integrated into the object statistical camera. In some embodiments, one or more components of the adjustment device 1100 may be integrated into the processing device 112.

The second obtaining module 1110 may be configured to obtain, for each of one or more regions in a monitoring range, count information of objects in the region.

The reporting module 1120 may be configured to report the count information of objects to the back-end monitoring storage device.

In some embodiments, the reporting module 1120 may report the count information of objects by at least one of reporting manners described below. Reporting manner 1: the reporting module 1120 may regularly report the count information of objects to the back-end monitoring storage device based on a predetermined reporting period. Reporting manner 2: the reporting module 1120 may report the count information of objects to the back-end monitoring storage device in response to a query request sent by the back-end monitoring storage device.

The second adjustment module 1130 may be configured to adjust at least one monitoring preset point of the object statistical camera in response to an adjustment instruction. The adjustment instruction may be generated based on the count information of objects by the back-end monitoring storage device.

In the present disclosure, the at least one monitoring preset point of the object statistical camera may be adjusted in real time according to actual object concentration situation (e.g., a density of the objects) in the one or more regions in the monitoring range of the object statistical camera, which can solve the problem that the monitoring preset point of the object statistical camera is fixed and a density of the objects in each region cannot be tracked in real time, thereby achieving effective supervision of key positions and key regions.

The modules in the adjustment device 1100 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Embodiment 4

In some embodiments, the present disclosure may also provide a storage medium storing a computer program thereon. When executed by a processor, the computer program may direct the processor to perform a process (e.g., process 900) described elsewhere in the present disclosure. As used herein, the storage medium may include but not limited to a U disk, a read-only memory (ROM), a random access memory (RAM), a mobile hard disk, a disk, an optical disk, or the like, or any combination thereof.

In some embodiments, the present disclosure may also provide a back-end monitoring storage device including a processor and a storage, wherein the storage stores a computer program. When executed by a processor, the computer program may direct the processor to perform a process (e.g., process 900) described elsewhere in the present disclosure. Optionally, for a specific example of the back-end monitoring storage device, reference may be made to examples described in the embodiment 2 and the description thereof.

In some embodiments, the present disclosure may also provide an object statistical camera including a processor and a storage, wherein the storage stores a computer program. When executed by a processor, the computer program may direct the processor to perform a process. The process may include, for each of one or more regions in a monitoring range of the object statistical camera, obtaining count information of objects in the region; reporting the count information of objects to a back-end monitoring storage device, and adjusting at least one monitoring preset point of the object statistical camera in response to an adjustment instruction generated by the back-end monitoring storage device based on the count information of objects. Optionally, for a specific example of the object statistical camera, reference may be made to examples described in the embodiment 3 and the description thereof.

Embodiment 5

In some embodiments, monitoring preset points may have already been set when a monitoring device is installed, which are greatly affected by subjective factors and may cause settings of the monitoring preset points to be unreasonable, monitoring ranges of the monitoring device to be inaccurate, and points that actually need attention are not monitored. In some embodiments, an object statistical camera is used, based on which actual distribution of objects in an object heat map can be acquired and a flow and concentration situation of objects can be grasped, and then monitoring preset points of a dome camera may be reasonably adjusted through a rotating device (e.g., a gimbal), thereby achieving effective supervision of key positions and key regions. It should be noted that the dome camera is merely provided for the purposes of illustration, and not intended to limit the scope of the present disclosure. Persons having ordinary skills in the art may understand that any camera that can realize a rotation of a camera len through a gimbal or other mechanisms is suitable herein, including but not limited to a dome camera, a gun machine, etc., which are commonly used in current monitoring technology.

Figure 12:
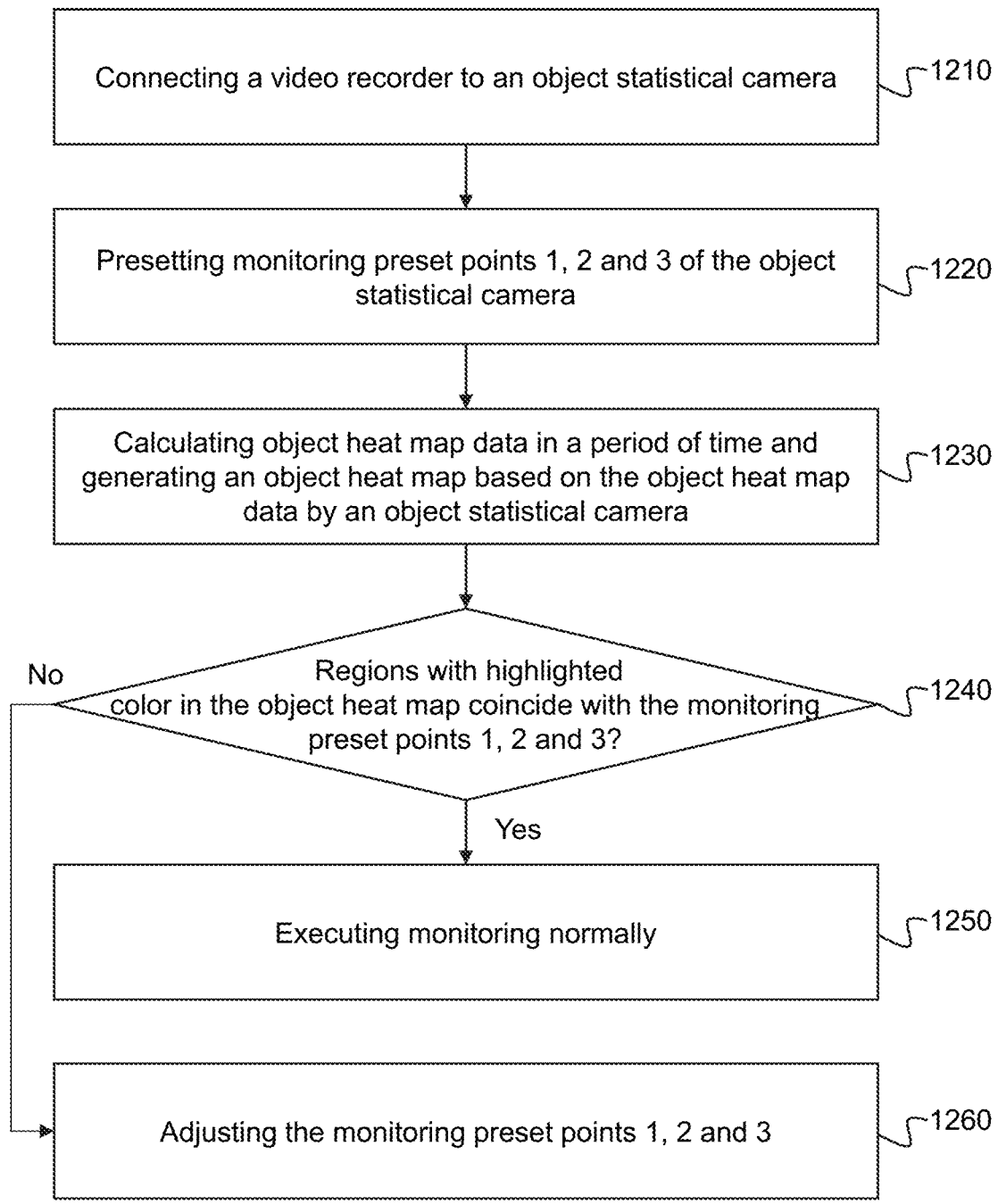
FIG. 12 is a flowchart illustrating an exemplary process for adjusting a monitoring preset point of a monitoring device according to some embodiments of the present disclosure.

FIG. 12 is a flowchart illustrating an exemplary process for adjusting a monitoring preset point of a monitoring device according to some embodiments of the present disclosure. In some embodiments, the process 1200 may be implemented as a set of instructions (e.g., an application) stored in the storage ROM 230 or RAM 240. The processor 220 and/or the modules in FIG. 4, FIG. 10, and FIG. 11 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process is illustrated in FIG. 12 and described below is not intended to be limiting.

In 1210, a video recorder may be connected to an object statistical camera. The application environment (e.g., the video recorder, the object statistical camera, a line between the video recorder and the object statistical camera) may be built to ensure that a line connection between the video recorder and the object statistical camera is normal and an image is output after the video recorder is powered on. In some embodiments, the video recorder may be directed by the processing device 112 (e.g., the monitoring image obtaining module 410, the processing circuits of the processor 220), the adjustment device 1000 (e.g., the first obtaining module 1010), and/or the adjustment device 1100 (e.g., the second obtaining module 1110), to connect to the object statistical camera.

In 1220, monitoring preset points 1, 2, and 3 of the object statistical camera may be preset. In some embodiments, since it is difficult to set specific monitoring preset points accurately in an early stage, video monitoring may be started with roughly set monitoring preset points 1, 2, and 3 or without monitoring preset points 1, 2, and 3. In some embodiments, the monitoring preset points 1, 2, and 3 of the object statistical camera may be set on an interface of the video recorder. In some embodiments, the monitoring preset points 1, 2, and 3 may be preset by the processing device 112 (e.g., the monitoring image obtaining module 410, the processing circuits of the processor 220), the adjustment device 1000 (e.g., the first obtaining module 1010), and/or the adjustment device 1100 (e.g., the second obtaining module 1110).

In 1230, after the object statistical camera works for a period of time, object heat map data in the period of time may be calculated and an object heat map may be generated based on the object heat map data. As used herein, the object heat map data may refer to data required to construct an object heat map that reflects a distribution of the objects. In some embodiments, the object heat map data may include count information of objects (e.g., a count of the objects) in one or more regions in a monitoring range of the object statistical camera. In some embodiments, a back-end monitoring storage device may obtain the object heat map data from a front-end object statistical camera by periodic query, and then classify the object heat map data and store the object heat map data into a database on a hard disk. Further, the back-end monitoring storage device may generate an object heat map based on the object heat map data. In the object heat map, different colors may indicate different counts of object(s). A monitoring personnel (e.g., an administrator) may view an object heat map within a specific period of time through a local interface of the back-end monitoring storage device and a web interface associated with the back-end monitoring storage device. For example, the object heat map data in the database may be gathered according to the time information inputted by a user (e.g., the monitoring personnel) and a temporary object heat map may be synthesized based on the object heat map data. Further, the temporary object heat map may be superimposed to a background picture and the object heat map may be finally displayed by an interface of a back-end device (e.g., the back-end monitoring storage device).

In some embodiments, the object heat map data may be analyzed and obtained by the processing device 112 (e.g., the statistical value obtaining module 420, the processing circuits of the processor 220), the adjustment device 1000 (e.g., the first obtaining module 1010), and/or the adjustment device 1100 (e.g., the second obtaining module 1110). In some embodiments, the object heat map may be generated by the processing device 112 (e.g., the statistical value obtaining module 420, the processing circuits of the processor 220) and the adjustment device 1000 (e.g., the determination module 1020).

In 1240, whether regions with highlighted color in the object heat map coincide with the monitoring preset points 1, 2, and 3 set earlier may be determined by the monitoring personnel. If the regions coincide with the monitoring preset points 1, 2, and 3, operation 1250 may be executed. If at least one of the regions is different (or greatly different) from the monitoring preset points 1, 2, and 3, operation 1260 may be executed. In some embodiments, whether regions coincide with the monitoring preset points 1, 2, and 3 may be determined by the processing device 112 (e.g., the adjustment instruction determination module 430, the processing circuits of the processor 220), the adjustment device 1000 (e.g., the first adjustment module 1030), and/or the adjustment device 1100 (e.g., the second adjustment module 1130).

In 1250, monitoring may be executed normally. In some embodiments, the normal execution of the monitoring may be determined by the processing device 112 (e.g., the monitoring setting adjustment module 440, the processing circuits of the processor 220), the adjustment device 1000 (e.g., the first adjustment module 1030), and/or the adjustment device 1100 (e.g., the second adjustment module 1130).

In 1260, the monitoring preset points 1, 2, and 3 may be adjusted. In some embodiments, one or more of the monitoring preset points 1, 2, and 3 may be replaced by other points by the processing device 112 (e.g., the monitoring setting adjustment module 440, the processing circuits of the processor 220), the adjustment device 1000 (e.g., the first adjustment module 1030), and/or the adjustment device 1100 (e.g., the second adjustment module 1130).

The above solution introduces an object heat map, which is a visual graphic displaying a geographical distribution of objects in a specially highlighted form. The monitoring personnel may view the object heat map through a local interface and a web interface, which allows the monitoring personnel to use the obtained object heat map data to adjust the monitoring preset points 1, 2, and 3 more reasonably.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 13:
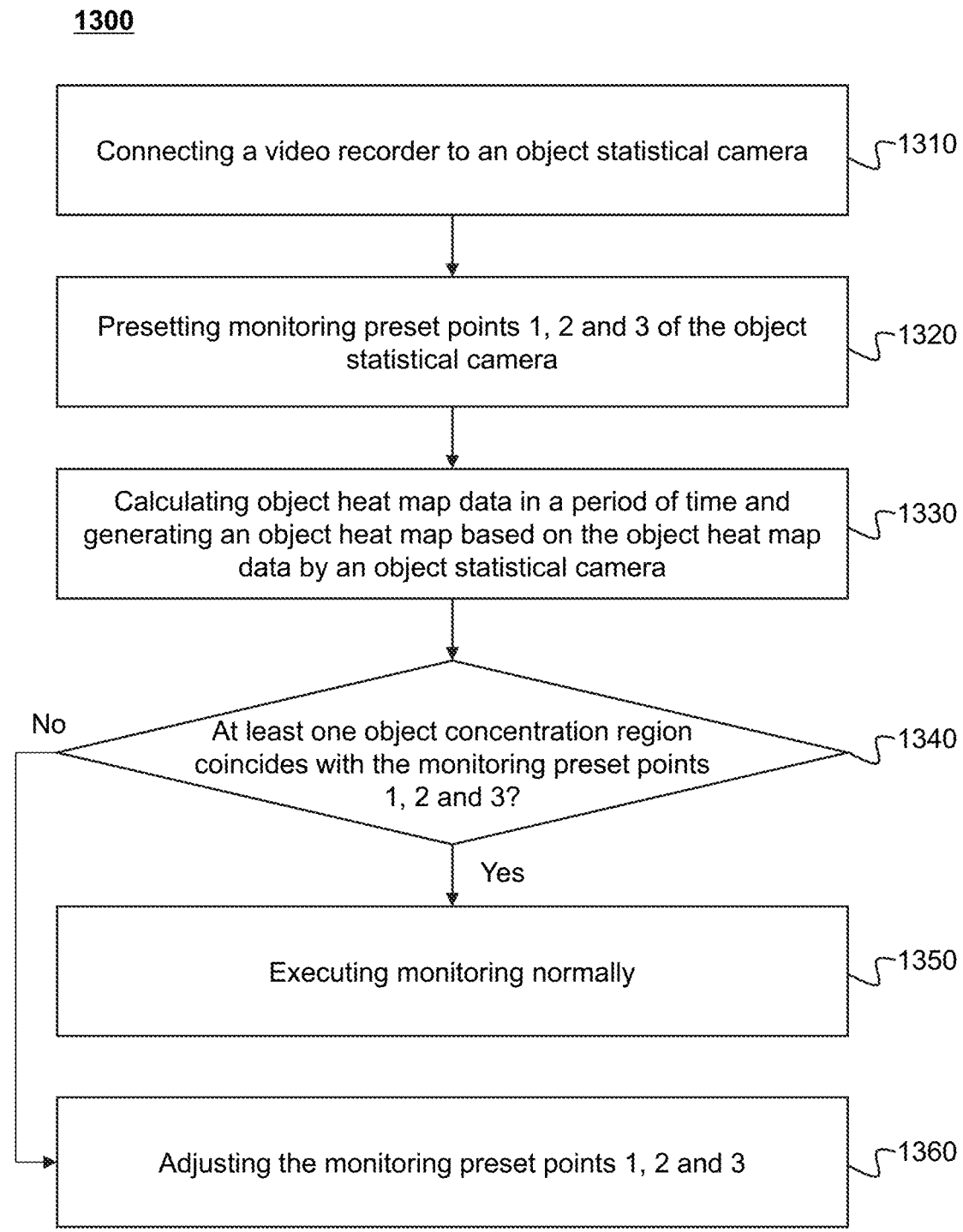
FIG. 13 is a flowchart illustrating an exemplary process for adjusting a monitoring preset point of a monitoring device according to some embodiments of the present disclosure.

FIG. 13 is a flowchart illustrating an exemplary process for adjusting a monitoring preset point of a monitoring device according to some embodiments of the present disclosure. In some embodiments, the process 1300 may be implemented as a set of instructions (e.g., an application) stored in the storage ROM 230 or RAM 240. The processor 220 and/or the modules in FIG. 4, FIG. 10, and FIG. 11 may execute the set of instructions, and when executing the instructions, the processor 220 and/or the modules may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process is illustrated in FIG. 13 and described below is not intended to be limiting.

In 1310, a video recorder may be connected to an object statistical camera. The application environment (e.g., the video recorder, the object statistical camera, a line between the video recorder and the object statistical camera) may be built to ensure that a line connection between the video recorder and the object statistical camera is normal and an image is output after the video recorder is powered on.

In 1320, monitoring preset points 1, 2, and 3 of the object statistical camera may be preset. In some embodiments, since it is difficult to set specific monitoring preset points accurately in an early stage, video monitoring may be started with roughly set monitoring preset points 1, 2, and 3 or without monitoring preset points 1, 2, and 3.

In 1330, after the object statistical camera works for a period of time, object heat map data in the period of time may be calculated and an object heat map may be generated based on the object heat map data. In some embodiments, a back-end monitoring storage device may obtain the object heat map data from a front-end object statistical camera by periodic query, and then classify the object heat map data and store the object heat map data into a database on a hard disk.

In 1340, the back-end monitoring storage device may determine at least one object concentration region based on the object heat map data and whether the at least one object concentration region coincides with the monitoring preset points 1, 2, and 3 set earlier. In some embodiments, the at least one object concentration region may be directly determined by analyzing the object heat map data. In some embodiments, an object heat map may be generated based on the object heat map data. Further, the at least one object concentration region may be determined by identifying regions with highlighted color in the object heat map. If the at least one object concentration region coincides with the monitoring preset points 1, 2, and 3, operation 1350 may be executed. If the at least one object concentration region is different (or greatly different) from the monitoring preset points 1, 2, and 3, operation 1360 may be executed.

In 1350, monitoring may be executed normally.

In 1360, the monitoring preset points 1, 2, and 3 may be adjusted.

In the above solution, without the participation of a monitoring personnel, the back-end monitoring storage device can automatically analyze the object heat map data to determine the at least one object concentration region, so that the monitoring preset points may be automatically adjusted based on the at least one object concentration region.

It should be noted that, in the operations 1230 and 1330, the object statistical camera may provide the object heat map data to the back-end monitoring storage device, and the back-end monitoring storage device may analyze the object heat map data or generate the object heat map, and analyze or display the object heat map. Persons having ordinary skills in the art should understand that the object heat map may also be generated by the object statistical camera, and analyzed or displayed by the back-end monitoring storage device. In the present disclosure, the object heat map data as the basis for drawing the object heat map and the heat map itself may belong to a category of the count information of objects described elsewhere in the present disclosure.

In the present disclosure, monitoring preset points of a monitoring device may be properly corrected by using an object heat map. By introducing the object heat map, a monitoring personnel may know an object concentration situation in one or more regions in a certain monitoring range of the monitoring device in real time, and correct monitoring preset points in time, thereby improving efficiency and accuracy of the monitoring.

It should be noted that the above description is merely provided for the purposes of illustration, and not intended to limit the scope of the present disclosure. For persons having ordinary skills in the art, multiple variations or modifications may be made under the teachings of the present disclosure.

However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or corn location of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one storage medium including a set of instructions; and
   at least one processor in communication with the at least one storage medium, wherein when executing the set of instructions, the at least one processor is directed to cause the system to implement operations including:
   obtaining one or more first monitoring images;
   obtaining, for each of one or more regions, a statistical value of at least one object in the region based on the one or more first monitoring images;
   determining an adjustment instruction based on the one or more statistical values of the at least one object in the one or more regions; and
   adjusting at least one monitoring setting of at least one monitoring device based on the adjustment instruction, the at least one monitoring device being used to capture one or more second monitoring images.

2. The system of claim 1, wherein the obtaining one or more first monitoring images comprises:
   obtaining the one or more first monitoring images with time and location information from a third party.

3. The system of claim 1, wherein the obtaining one or more first monitoring images comprises:
   obtaining the one or more first monitoring images captured by one or more capturing devices at one or more time points.

4. The system of claim 3, wherein the at least one processor is directed to cause the system to implement operations further including:
   determining the adjustment instruction based on the one or more statistical values of the at least one object at the one or more time points by using an instruction generation model, the instruction generation model including a machine learning model.

5. The system of claim 1, wherein the determining, for each of one or more regions, a statistical value of at least one object in the region based on the one or more first monitoring images comprises:
   for each of the one or more first monitoring images,
      determining a position relationship between the first monitoring image and each of the one or more regions;
      determining the at least one object and position information of the at least one object in the first monitoring image by using an object recognition model; and
      determining the statistical value of the at least one object in the region based on the position relationship between the first monitoring image and each of the one or more regions and the position information of the at least one object in the first monitoring image.

6. The system of claim 1, wherein the determining an adjustment instruction based on the one or more statistical values of the at least one object in the one or more regions comprises:
   determining an object quantity indicator map based on the one or more statistical values of the at least one object in the one or more regions; and
   obtaining the adjustment instruction from an input device, wherein the adjustment instruction is determined by a user based on the object quantity indicator map.

7. The system of claim 1, wherein the determining an adjustment instruction based on the one or more statistical values of the at least one object in the one or more regions comprises:
   determining whether at least one statistical value satisfies a predetermined condition; and
   determining the adjustment instruction based on a determination result of whether the at least one statistical value satisfies the predetermined condition.

8. The system of claim 7, wherein:
   the determination result includes that the at least one statistical value satisfies the predetermined condition; and
   the determining the adjustment instruction based on the determination result includes designating, among the one or more regions, at least one region corresponding to the at least one statistical value as at least one adjusted monitoring region of the at least one monitoring device.

9. The system of claim 1, wherein the adjusting at least one monitoring setting of at least one monitoring device based on the adjustment instruction comprises:
   for each of the at least one monitoring device, determining a difference between the adjustment instruction and the at least one monitoring setting of the monitoring device; and
   adjusting the at least one monitoring setting of the monitoring device based on the difference.

10. The system of claim 1, wherein the at least one processor is directed to cause the system to implement operations further including:
    adjusting the at least one monitoring device based on the at least one monitoring setting.

11. A method implemented on a computing device including at least one processor, at least one storage medium, and a communication platform connected to a network, the method comprising:
    obtaining one or more first monitoring images;
    obtaining, for each of one or more regions, a statistical value of at least one object in the region based on the one or more first monitoring images;
    determining an adjustment instruction based on the one or more statistical values of the at least one object in the one or more regions; and
    adjusting at least one monitoring setting of at least one monitoring device based on the adjustment instruction, the at least one monitoring device being used to capture one or more second monitoring images.

12. The method of claim 11, wherein the obtaining one or more first monitoring images comprises:
    obtaining the one or more first monitoring images with time and location information from a third party.

13. The method of claim 11, wherein the obtaining one or more first monitoring images comprises:
    obtaining the one or more first monitoring images captured by one or more capturing devices at one or more time points.

14. The method of claim 13, further including:
    determining the adjustment instruction based on the one or more statistical values of the at least one object at the one or more time points by using an instruction generation model, the instruction generation model including a machine learning model.

15. The method of claim 11, wherein the determining, for each of one or more regions, a statistical value of at least one object in the region based on the one or more first monitoring images comprises:
    for each of the one or more first monitoring images,
       determining a position relationship between the first monitoring image and each of the one or more regions;
       determining the at least one object and position information of the at least one object in the first monitoring image by using an object recognition model; and
       determining the statistical value of the at least one object in the region based on the position relationship between the first monitoring image and each of the one or more regions and the position information of the at least one object in the first monitoring image.

16. The method of claim 11, wherein the determining an adjustment instruction based on the one or more statistical values of the at least one object in the one or more regions comprises:
    determining an object quantity indicator map based on the one or more statistical values of the at least one object in the one or more regions; and
    obtaining the adjustment instruction from an input device, wherein the adjustment instruction is determined by a user based on the object quantity indicator map.

17. The method of claim 11, wherein the determining an adjustment instruction based on the one or more statistical values of the at least one object in the one or more regions comprises:
- determining whether at least one statistical value satisfies a predetermined condition; and
- determining the adjustment instruction based on a determination result of whether the at least one statistical value satisfies the predetermined condition.

18. The method of claim 17, wherein:
- the determination result includes that the at least one statistical value satisfies the predetermined condition; and
- the determining the adjustment instruction based on the determination result includes designating, among the one or more regions, at least one region corresponding to the at least one statistical value as at least one adjusted monitoring region of the at least one monitoring device.

19. The method of claim 11, wherein the adjusting at least one monitoring setting of at least one monitoring device based on the adjustment instruction comprises:
- for each of the at least one monitoring device, determining a difference between the adjustment instruction and the at least one monitoring setting of the monitoring device; and
- adjusting the at least one monitoring setting of the monitoring device based on the difference.

20. A non-transitory computer readable medium, comprising executable instructions that, when executed by at least one processor, direct the at least one processor to perform a method, the method comprising:
- obtaining one or more first monitoring images;
- obtaining, for each of one or more regions, a statistical value of at least one object in the region based on the one or more first monitoring images;
- determining an adjustment instruction based on the one or more statistical values of the at least one object in the one or more regions; and
- adjusting at least one monitoring setting of at least one monitoring device based on the adjustment instruction, the at least one monitoring device being used to capture one or more second monitoring images.

* * * * *